United States Patent
Xu et al.

(10) Patent No.: US 10,947,394 B2
(45) Date of Patent: Mar. 16, 2021

(54) RADIATIVE COOLING FUNCTIONAL COATING MATERIAL AND APPLICATION THEREOF

(71) Applicants: Ningbo Radi-Cool Advanced Energy Technologies Co., Ltd., Ningbo (CN); Ningbo Ruiling Advanced Energy Materials Institute Co., Ltd., Ningbo (CN)

(72) Inventors: Shaoyu Xu, Ningbo (CN); Rongbing Wan, Ningbo (CN); Minghui Wang, Ningbo (CN)

(73) Assignees: NINGBO RADI-COOL ADVANCED ENERGY TECHNOLOGIES CO., LTD., Ningbo (CN); NINGBO RUILING ADVANCED ENERGY MATERIALS INSTITUTE CO., LTD., Ningbo (CN)

( * ) Notice: Subject to any disclaimer, the term of this patent is extended or adjusted under 35 U.S.C. 154(b) by 49 days.

(21) Appl. No.: 16/574,093

(22) Filed: Sep. 18, 2019

(65) Prior Publication Data
US 2021/0002491 A1    Jan. 7, 2021

Related U.S. Application Data

(63) Continuation of application No. PCT/CN2019/097856, filed on Jul. 26, 2019.

(30) Foreign Application Priority Data

Jul. 5, 2019  (CN) .......................... 201910607455.2

(51) Int. Cl.
*C09D 5/00*  (2006.01)
*C09D 5/33*  (2006.01)
(Continued)

(52) U.S. Cl.
CPC ............. *C09D 5/004* (2013.01); *C09D 5/002* (2013.01); *C09D 5/22* (2013.01); *C09D 133/04* (2013.01); *C09D 163/00* (2013.01); *C09D 167/00* (2013.01); *C09D 175/04* (2013.01); *C09D 183/04* (2013.01); *E04D 11/02* (2013.01);
(Continued)

(58) Field of Classification Search
CPC ............... C09D 5/00; C09D 5/33; G02B 5/20
See application file for complete search history.

(56) References Cited

U.S. PATENT DOCUMENTS

| | | | | |
|---|---|---|---|---|
| 4,426,570 A * | 1/1984 | Hikino | ..................... | H05B 3/44 219/553 |
| 2020/0139935 A1* | 5/2020 | Kherani | ................... | G02B 1/10 |
| 2021/0002491 A1* | 1/2021 | Xu | | |

FOREIGN PATENT DOCUMENTS

CN       109651973 A     4/2019

* cited by examiner

*Primary Examiner* — Michael A Salvitti

(57) ABSTRACT

The present disclosure provides a radiative cooling functional coating material and application thereof. The radiative cooling functional coating material can be configured for manufacturing a radiative cooling functional layer. The radiative cooling functional layer can be configured for reflecting ultraviolet light and/or visible light and/or near-infrared light in sunlight and emitting heat through an atmospheric window in a form of infrared radiation. The radiative cooling functional coating material can include a granular filler and a radiative cooling functional resin, and the granular filler can be distributed in the radiative cooling functional resin.

17 Claims, 15 Drawing Sheets

(51) Int. Cl.
*C09D 5/22* (2006.01)
*C09D 133/04* (2006.01)
*C09D 163/00* (2006.01)
*C09D 167/00* (2006.01)
*C09D 175/04* (2006.01)
*C09D 183/04* (2006.01)
*E04D 11/02* (2006.01)
*G02B 5/20* (2006.01)
*C08K 3/36* (2006.01)
*C08K 3/40* (2006.01)
*C08K 3/22* (2006.01)
*C08K 3/26* (2006.01)
*C08K 3/30* (2006.01)

(52) U.S. Cl.
CPC ............... *G02B 5/208* (2013.01); *C08K 3/36* (2013.01); *C08K 3/40* (2013.01); *C08K 2003/2213* (2013.01); *C08K 2003/2241* (2013.01); *C08K 2003/2244* (2013.01); *C08K 2003/2296* (2013.01); *C08K 2003/265* (2013.01); *C08K 2003/3036* (2013.01); *C08K 2003/3045* (2013.01); *C08K 2201/003* (2013.01)

RADIATIVE COOLING FUNCTIONAL COATING MATERIAL AND APPLICATION THEREOF

CROSS-REFERENCE TO RELATED APPLICATIONS

This application is a continuation of PCT patent application PCT/CN2019/097856 filed on Jul. 26, 2019, which claims all benefits accruing under 35 U.S.C. § 119 from China Patent Application No. 201910607455.2, filed on Jul. 5, 2019, in the China National Intellectual Property Administration, the content of which is hereby incorporated by reference.

TECHNICAL FIELD

The present disclosure relates to the technical field of material science, and in particular, to a radiative cooling functional coating material and application thereof.

BACKGROUND

The sun is a huge source of radiation. When sunlight hits the earth, some of the radiative energy is absorbed by the atmosphere and some of the radiative energy is reflected back to the universe. Because objects on earth can absorb radiative energy, the surface temperature the objects on earth can be higher than the temperature of the air above the surface of the earth. Objects which require cooling increase energy consumption and greenhouse gas emissions. Referring to FIG. 1, the electromagnetic spectrum of solar radiation can be divided into three zones, the ultraviolet light, visible light, and near-infrared light, the ratios of which are respectively 6.6%, 44.7%, and 48.7%.

In radiative cooling, space is regarded as a cold source and the earth and objects on earth are regarded as heat sources to establish a radiation heat transferring channel. Heat can be radiated through the atmospheric window in a specific wave range of the electromagnetic spectrum without consuming energy, such that the heat can be transferred directly to the space through the atmospheric window to achieve cooling.

Referring to FIG. 2, the atmospheric window refers to electromagnetic waves which are less reflected, absorbed, scattered, and highly transmitted when they penetrate through the atmosphere. The atmospheric window is commonly the electromagnetic waves in ranges of 0.3 µm-1.155 µm, 1.4 µm-1.9 µm, 2 µm-2.5 µm, 3.5 µm-5 µm, 7 µm-14 µm, etc., and has high transmittance. The mid-infrared lights emitted by the objects on the surface of the earth can transfer heat to the outer space through these atmospheric windows in these bands.

An ideal material for radiative cooling should have optical properties of a high emissivity in the wave range of the atmospheric window and a very low emissivity (that is, low absorptivity) beyond the bands of the atmospheric window. In general, natural materials hardly have such optical properties, while materials treated by some material engineering techniques can have selective optical properties for the atmospheric window, such as a high emissivity in the wave range of the atmospheric window and a low absorptivity beyond the bands of the atmospheric window, thereby achieving effectively radiative cooling.

Generally, an energy-saving coating can reflect the sunlight at visible and near-infrared wave ranges by adding a filler, resulting in a cooling effect. However, the cooling effect is limited, mechanical strength is low, and weather resistance is poor, leading to no practical value.

SUMMARY

The present disclosure is to provide a radiative cooling functional coating material. A radiative cooling coating layer based on the radiative cooling functional coating material has a high reflectivity on the entire solar emission energy spectrum and a high emissivity in the wave range of the atmospheric window (in a range of 7 µm to 14 µm). The present disclosure also provides corresponding application methods based on the radiative cooling functional coating material and composite materials based on the radiative cooling coating layer.

The present disclosure provides a radiative cooling functional coating material for manufacturing a radiative cooling functional layer configured for reflecting ultraviolet light and/or visible light and/or near-infrared light in sunlight and emitting heat through an atmospheric window in a form of infrared radiation. The radiative cooling functional coating material can include a granular filler and a radiative cooling functional resin, and the granular filler can be distributed in the radiative cooling functional resin.

In one embodiment, the granular filler can have a shape of a rod, a sphere or an ellipsoid, and when the granular filler is rod-shaped or ellipsoid-shaped, a ratio of a length of the granular filler and a diameter of the granular filler can be in a range of 1:1 to 10:1. The length of the granular filler can be a longest distance between two endpoints of the granular filler. The diameter of the granular filler can be a longest distance in a direction perpendicular to the length of the granular filler.

In one embodiment, the granular filler can be orderly arranged in the radiative cooling functional resin, and the ordered arrangement means the granular filler is uniformly and directionally distributed in the radiative cooling functional resin.

In one embodiment, the granular filler can include a first granular filler and/or a second granular filler, and the first granular filler can have a diameter in a range of 0.5 µm to 40 µm. The radiative cooling functional layer including the first granular filler can be configured for reflecting the visible light and the near-infrared light and emitting heat through the atmospheric window in the form of infrared radiation.

The second granular filler can have a diameter in a range of 0.01 µm to 40 µm. And the radiative cooling functional layer including the second granular filler can be configured for reflecting the ultraviolet light and the visible light and emitting heat in the form of infrared radiation through the atmospheric window. A diameter of granular filler can be a volume mean diameter of the granular filler in present disclosure.

In one embodiment, the first granular filler and the second granular filler can be respectively aluminum silicate, pearl powder, silicon dioxide, calcium carbonate, aluminum oxide, zinc oxide, zirconium oxide, cerium oxide, lanthanum oxide, rhodium dioxide, barium sulfate, talcum powder, titanium dioxide, zinc sulfide, ceramic powder, magnesium oxide, ceramic bead, glass bead, or a combination thereof.

In one embodiment, the first granular filler can be aluminum silicate, pearl powder, silicon dioxide, calcium carbonate, barium sulfate, talcum powder, titanium dioxide, zinc sulfide, ceramic powder, ceramic bead, glass bead, or a combination thereof.

In one embodiment, the second granular filler can be aluminum oxide, zinc oxide, zirconium oxide, cerium oxide, lanthanum oxide, rhodium dioxide, magnesium oxide, or a combination thereof.

In one embodiment, the radiative cooling functional resin can be epoxy resin, polyester, polyurethane, acrylic resin, silicone resin, or a combination thereof.

In one embodiment, the radiative cooling functional coating material can further include a directional agent configured for controlling an orientation of the granular filler.

In one embodiment, the directional agent can be aqueous acetic acid-butyl cellulose, ethylene-vinyl acetate copolymer wax emulsion, polyethylene wax, polyamide wax, or a combination thereof.

In one embodiment, the radiative cooling functional coating material can further include a pigment.

In one embodiment, the pigment can be a fluorescent dye.

The present disclosure can further provide an application method of the radiative cooling functional coating material, comprising coating the radiative cooling functional coating material on a surface of a substrate or a main body to obtain a radiative cooling functional layer, wherein the radiative cooling functional layer is configured for reflecting and/or emitting heat outwardly.

In one embodiment, the substrate can be one of metal, plastic, rubber, concrete, cement, asphalt, paper, textile, wood, ceramic tile, glass, and organic synthetic material.

In one embodiment, the main body can be one of a building, a photovoltaic module, a system comprising the photovoltaic module, an automobile, an outdoor product, greenhouses of agriculture, husbandry, and aquaculture, aerospace equipment, a cold chain transportation device, an outdoor cabinet, textile industry, outdoor communication equipment, industrial equipment, a public service, a cooling water system, an energy system and energy-saving equipment.

The present disclosure can further provide a selective radiative cooling coating layer including the radiative cooling functional layer manufactured from the radiative cooling functional coating material.

In one embodiment, the radiative cooling functional layer can include a first radiative cooling functional layer and a second radiative cooling functional layer, the first radiative cooling functional layer can include the radiative cooling functional resin and a first granular filler distributed in the radiative cooling functional resin, and the second radiative cooling functional layer can include the radiative cooling functional resin and a second granular filler distributed in the radiative cooling functional resin.

In one embodiment, the first radiative cooling functional layer can have a thickness of 30 μm to 300 μm, and the second radiative cooling functional layer can have a thickness of 10 μm to 60 μm.

In one embodiment, the radiative cooling functional layer can include a first surface and a second surface away from the first surface, the selective radiative cooling coating layer further include a weather resistant resin layer located on the first surface of the radiative cooling functional layer, and/or a primer resin layer located on the second surface of the radiative cooling functional layer.

In one embodiment, the weather resistant resin layer can have a transmittance that is larger than or equal to 80%, and a material of the weather resistant resin layer can include fluorine-containing resin, epoxy resin, polyester, polyurethane, acrylic resin, silicon resin, or a combination thereof.

A material of the primer resin layer can include an epoxy resin and/or an acrylic resin.

In one embodiment, the weather resistant resin layer can have a thickness of 10 μm to 50 μm, and the primer resin layer can have a thickness of 10 μm to 50 μm.

In one embodiment, a weight ratio of the granular filler to the radiative cooling functional layer can be in a range of 1:10 to 6:1.

In one embodiment, the radiative cooling functional layer can have a reflectivity of solar energy that is greater than or equal to 80% and an atmospheric window emissivity that is larger than or equal to 80%, and is able to provide a radiative cooling power of larger than or equal to 100 W/m² at room temperature.

The present disclosure further discloses a composite material including the selective radiative cooling coating layer which further includes a substrate, and the selective radiative cooling coating layer can be disposed on the substrate.

In one embodiment, the substrate can be one of metal, plastic, rubber, concrete, cement, asphalt, paper, textile, wood, ceramic tile, glass or organic synthetic material.

As can be seen from the above technical proposals, the embodiments of the present disclosure have the following advantages:

(1) The selective radiative cooling coating layer of the present disclosure has a reflectivity of solar energy (in a range of 300 nm to 2500 nm) that is larger than or equal to 80% and an atmospheric window emissivity that is larger than or equal to 80%, and is able to provide a radiative cooling power of larger than or equal to 100 W/m² at room temperature.

(2) The selective radiative cooling coating layer of the present disclosure has a high mechanical strength, good weather resistance and great practical value.

DETAILED DESCRIPTION

The technical proposals of the embodiments of the present disclosure will be clearly and completely described below by combining with drawings. It is obvious that the described embodiments are only a part and not all of the embodiments of the present disclosure. All other embodiments obtained by one skilled in the art based on the embodiments of the present disclosure without any creative efforts are within the scope of the present disclosure.

Terms "first", "second", "third" and the like in the specification and claims of the present disclosure and the above-mentioned drawings are used to distinguish different objects, and are not intended to describe a specific order. Furthermore, terms "comprises", "includes" and any variants thereof are intended to cover a non-exclusive inclusion.

An embodiment of the present disclosure provides a radiative cooling functional coating material for manufacturing a radiative cooling functional layer. The radiative cooling functional layer is configured for reflecting ultraviolet light and/or visible light and/or near-infrared light in sunlight and emitting heat through an atmospheric window in a form of infrared radiation. The radiative cooling functional coating material can include a granular filler and a radiative cooling functional resin, and the granular filler can be distributed in the radiative cooling functional resin.

The granular filler can have a shape of a rod, a cuboid, a cube, a sphere, an ellipsoid, a polyhedron, a shaft, a plate or an irregular shape. Further, the granular filler can have a selectable shape such that the granular filler has a resonance-enhanced surface plasmon absorption in a wave range of the atmospheric window. In order to further improve a reflection of sunlight (in a wave range of 0.3 µm to 2.5 µm) of the radiative cooling functional layer and an emissivity of the atmospheric window (in a wave range of 7 µm to 14 µm), the granular filler can preferably have the shape of rod, spherical, or ellipsoidal. When the granular filler is rod-shaped or ellipsoidal, a ratio of a length of the granular filler and a diameter of the granular filler can be in a range of 1:1 to 10:1. The length of the granular filler can be a longest distance between two endpoints of the granular filler. The diameter of the granular filler can be a longest distance in a direction perpendicular to the length of the granular filler.

The rod-shaped granular filler can have a better resonance-enhanced surface plasmon absorption of the atmospheric window with the wave range of 7 µm to 14 µm, reflect and scatter the sunlight multiple times. So, the radiative cooling functional layer including the rod-shaped granular filler can have a higher reflectivity to the sunlight (in wave range of 0.3 µm to 2.5 µm), and effectively convert the heat into the infrared light in the wave range of 7 µm to 14 µm with higher emissivity. The granular filler is preferably rod-shaped as shown in FIG. 3a to FIG. 3c.

Figure 1:
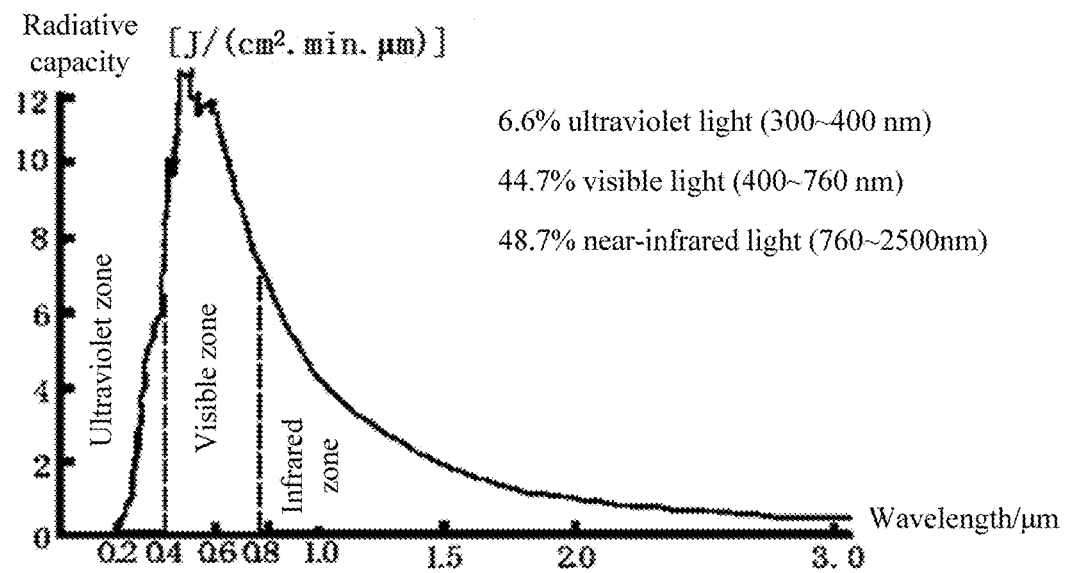
FIG. 1 is a solar radiation energy spectrum, wherein in the solar radiation energy spectrum per minute, ratios of the ultraviolet light, visible light, and near-infrared light are respectively 6.6%, 44.7%, and 48.7%.
Figure 2:
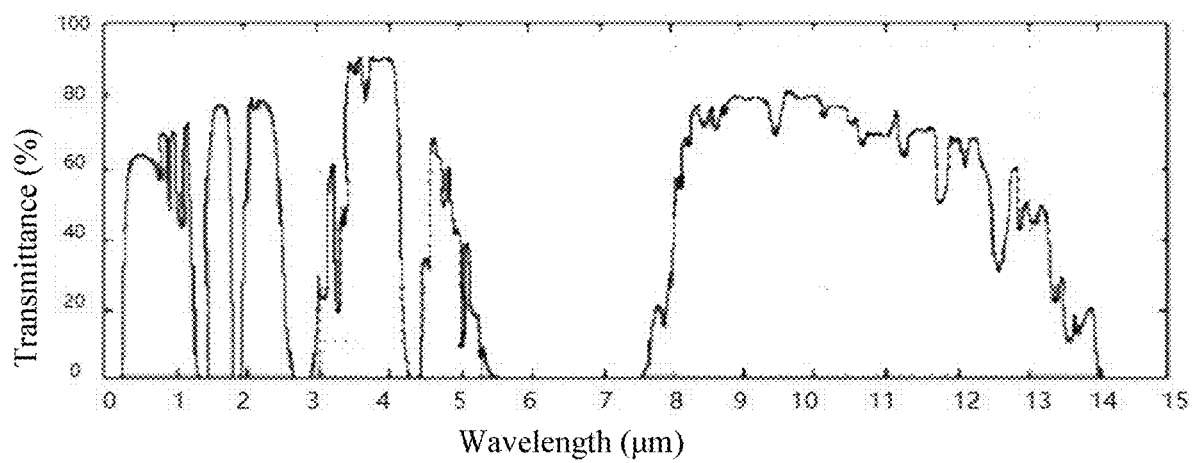
FIG. 2 is an atmospheric transmittance spectrum, wherein the atmospheric window refers to electromagnetic waves which are less reflected, absorbed, scattered and highly transmitted when they penetrate through the atmosphere.
Figure 3A:
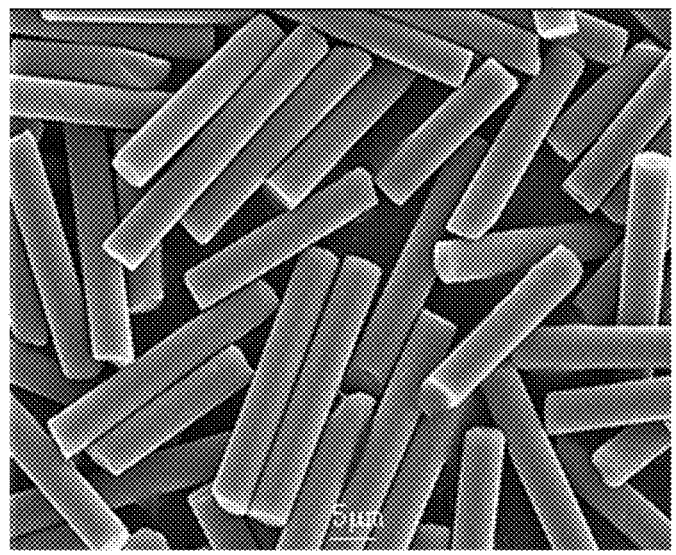
FIG. 3a is a microscopic enlarged view of a first rod-shaped granular filler in an embodiment of the present disclosure, wherein a ratio of a length of the first rod-shaped granular filler to a diameter of the first rod-shaped granular filler is about 5:1 and a volume average diameter of the first rod-shaped granular filler is about 9.8 μm. The length of the granular filler can be a longest distance between two endpoints of the granular filler. The diameter of the granular filler can be a longest distance in a direction perpendicular to the length of the granular filler.
Figure 3B:
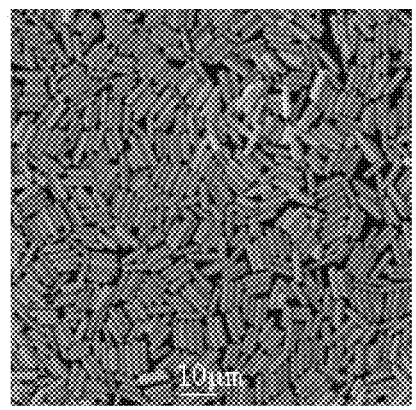
FIG. 3b is a microscopic enlarged view of a second rod-shaped granular filler in another embodiment of the present disclosure, wherein a ratio of a length of the second rod-shaped granular filler to a diameter of the second rod-shaped granular filler is about 4:1 and a volume mean diameter of the second rod-shaped granular filler is about 4.6 μm. The length of the granular filler can be a longest distance between two endpoints of the granular filler. The diameter of the granular filler can be a longest distance in a direction perpendicular to the length of the granular filler.
Figure 3C:
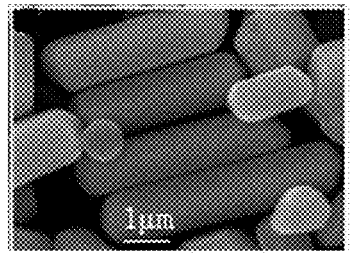
FIG. 3c is a microscopic enlarged view of a third rod-shaped granular filler in another embodiment of the present disclosure, wherein a ratio of a length of the third rod-shaped granular filler to a diameter of the third rod-shaped granular filler is about 3:1 and a volume mean diameter of the third rod-shaped granular filler is about 1.6 µm. The length of the granular filler can be a longest distance between two endpoints of the granular filler. The diameter of the granular filler can be a longest distance in a direction perpendicular to the length of the granular filler.

FIG. 3a to FIG. 3c respectively show three kinds of rod-shaped granular fillers having different ratios of the length to the diameter and volume average diameters. Referring to FIG. 3a, the ratio of the length to the diameter of the rod-shaped granular fillers is 5:1 and the volume average diameter is 9.8 µm. Referring to FIG. 3b, the ratio of the length to the diameter of the rod-shaped granular fillers is 4:1 and the volume average diameter is 4.6 µm. Referring to FIG. 3c, the ratio of the length to the diameter of the rod-shaped granular fillers is 3:1 and the volume average diameter is 1.6 µm. Referring to FIG. 3a to FIG. 3c, the reflection and radiation effects on the sunlight of the three rod-shaped granular fillers vary with the ratio of the length to the diameter and the volume average diameter.

Considering that when manufacturing the radiative cooling functional layer by the radiative cooling functional coating material, a thickness of the radiative cooling functional layer is affected by a particle size of the rod-shaped granular filler and the ratio of the length to the diameter of the rod-shaped granular filler can be preferably selected such that the granular filler can have the better resonance-enhanced surface plasmon absorption of the atmospheric window with a wave range of 7 µm to 14 µm, the ratio of the length to the diameter of the rod-shaped granular filler is preferably in a range of 3:1 to 8:1, more preferably, in a range of 4:1 to 6:1.

The granular filler can be aluminum silicate, silicon dioxide, aluminum oxide, zinc oxide, zirconium oxide, cerium oxide, lanthanum oxide, rhodium dioxide, barium sulfate, zinc sulfide, magnesium oxide, or a combination thereof. The granular filler can be pearl powder, calcium carbonate powder, talcum powder, titanium dioxide powder, ceramic powder, ceramic bead, glass bead, or a combination thereof.

Alternatively, the granular filler can include a first granular filler and/or a second granular filler. That is, when the radiative cooling functional coating material includes a radiative cooling functional resin and a first granular filler distributed in the radiative cooling functional resin, it can be regarded as a first radiative cooling functional coating material. When the radiative cooling functional coating material includes a radiative cooling functional resin and a second granular filler distributed in the radiative cooling functional resin, it can be regarded as a second radiative cooling functional coating material. The first radiative cooling functional coating material and the second radiative cooling functional coating material may be used at the same time. In use, the radiative cooling functional resin in the first radiative cooling functional coating material may be the same as or different from that of the second radiative cooling functional coating material.

Optionally, the first granular filler may be a material having a high reflectivity (such as more than or equal to 80%) of the visible light and the near-infrared, and an infrared emissivity of the atmospheric window (in the wave range of 7 µm to 14 µm) which is greater than 80%. The first granular filler may be aluminum silicate, pearl powder, silicon dioxide, calcium carbonate powder, barium sulfate, talcum powder, titanium dioxide, zinc sulfide, ceramic powder, ceramic bead, glass bead, or a combination thereof. The particle diameter of the first granular filler can be in a range of 0.5 µm to 40 µm. Preferably, the particle diameter of the first granular filler can be in a range of 1 µm to 20 µm, and more preferably, in a range of 2 µm to 6 µm.

The second granular filler may be a material having a high reflectivity (such as more than or equal to 80%) of the ultraviolet light and visible light, and an infrared emissivity of the atmospheric window (in the wave range of 7 µm to 14 µm) which is greater than 80%. The second granular filler may be aluminum oxide, zinc oxide, zirconium oxide, cerium oxide, lanthanum oxide, rhodium dioxide, magnesium oxide, or a combination thereof. The particle diameter of the second granular filler can be in a range of 0.01 µm to 40 µm. Preferably, the particle diameter of the second granular filler can be in a range of 0.1 µm to 10 µm, and more preferably, in a range of 0.6 µm to 5 µm.

Alternatively, when the granular filler in the radiative cooling functional coating material includes the first granular filler and the second granular filler, or when the first radiative cooling functional coating and the second radiative cooling functional coating are used simultaneously, the particle diameter of the first granular filler can be larger than the particle diameter of the second granular filler, and the ratio of the length to the diameter of the first granular filler is greater than the ratio of the length to the diameter of the second granular filler. The granular fillers with different particle diameters and different ratios of the length to the diameter can have different functions. The granular filler with a large particle diameter and a large ratio of the length to the diameter can better reflect the visible light and the near-infrared light. The granular filler with a small particle diameter and a small ratio of the length to the diameter can better reflect the ultraviolet light and the visible light. The granular filler with the large particle diameter and the large ratio of the length to the diameter can emit the infrared light in the wave range of 7 µm to 14 µm, while the granular filler with the small particle diameter and the large ratio of the length to the diameter can further enhance an infrared light emission of the radiative cooling functional layer in the wave range of 7 µm to 14 µm.

It can be understood that when the granular filler in the radiative cooling functional coating is only one kind but has different particle diameters and ratios of the length to the diameter, according to the action of the above-mentioned large particle size and small particle size of particle packing, the larger particle size filler can act more as a first filler and the smaller particle size filler can act more as a second filler.

Alternatively, the granular filler can be ordered arranged in the radiative cooling functional resin. The ordered arrangement means that the granular filler is uniformly and directionally distributed in the radiative cooling functional resin and even in the radiative cooling functional layer. When the granular filler is directionally distributed in the radiative cooling functional layer, an angle between a longest diameter of the granular filler and a surface of the radiative cooling functional layer can be in a range of 0 degree to 45 degrees, preferably, in a range of 0 degree to 30 degrees. The granular fillers can be orderly arranged, such that the granular filler can be evenly distributed in the radiative cooling functional resin and the radiative cooling functional layer can have the resonance-enhanced surface plasmon absorption in the atmospheric window with the wave range of 7 μm to 14 μm and the reflection of the sunlight at a certain controlled angle, thereby the reflectivity of the ultraviolet light, the visible light and the near-infrared light and the emissivity of the infrared light in the wave range of 7 μm to 14 μm of the radiative cooling functional layer can be improved.

An orientation of the granular filler can be controlled by an additive such as a directional agent added to the radiative cooling functional coating, such as aqueous acetic acid-butyl cellulose (CMCAB), ethylene-vinyl acetate copolymer (EVA) wax emulsion, polyethylene wax and polyamide wax. The directional agent can align the granular filler by adjusting a rate of volatilization or an anchoring effect.

The radiative cooling functional resin may be epoxy resin, polyester, urethane resin, acrylic resin, silicon resin, or a combination thereof. The radiative cooling functional resin can have a low solar absorptivity and a higher selective emissivity. The radiative cooling functional resin can be combined with the granular filler distributed therein to enhance the properties of reflecting the sunlight (in a wave range of 300 nm to 2500 nm) and emitting the infrared lights of the atmospheric window in the wave range of 7 μm to 14 μm. In addition, the radiative cooling functional resin can also improve a mechanical strength of the radiative cooling functional layer and its weather resistance.

Alternatively, the radiative cooling functional coating material in the present disclosure can be a liquid which is aqueous or oily.

In some embodiments, the radiative cooling functional coating material of the present disclosure can further include a pigment configured for adjusting the color of the radiative cooling functional coating material. The pigment may be a common color paste, an infrared reflective pigment, a fluorescent dye, or a combination thereof.

In a preferred embodiment, the fluorescent dye can be added as the pigment to the radiative cooling functional coating material. The fluorescent dye may not substantially affect the reflective property of the radiative cooling functional coating material and the radiative cooling functional coating material can have a great performance.

By adding pigments of different colors, the radiative cooling functional coating material may have a color of red, orange, yellow, green, cyan, blue, purple, gray, brown, and the like. The purpose of manufacturing the radiative cooling functional coating material in different colors is to meet the color requirements in different applications.

The present disclosure further provides an application method of the radiative cooling functional coating material including coating the radiative cooling functional coating material on a surface of a substrate or a main body to obtain a radiative cooling functional layer. The radiative cooling functional layer can reflect and/or emit heat outward.

The substrate can be one of metal, plastic, rubber, concrete, cement, asphalt, paper, textile, wood, ceramic tile, glass, and organic synthetic material. The main body is one of a building, a photovoltaic module, a system including the photovoltaic module, an automobile, an outdoor product, greenhouses of agriculture, husbandry, and aquaculture, aerospace equipment, a cold chain transportation device, an outdoor cabinet, textile industry, outdoor communication equipment, industrial equipment, public service equipment, a cooling water system, an energy system (e.g., air conditioning system, cooling system or heating system), and energy-saving equipment.

The building can include an industrial building, a commercial building, a residential building, a public building, and so on.

The industrial equipment can include an outdoor power distribution cabinet and the like.

The public service equipment can include a street lamp and a heat sink device thereof, a roof and wall surfaces of a toilet, a pavement of a stadium, and the like.

Optionally, a coating method of the radiative cooling functional coating material in the present disclosure may include brushing, roller coating, spraying, and the like. When the radiative cooling functional coating material includes the first radiative cooling functional coating material and the second radiative cooling functional coating material, one layer can be firstly prepared and dried and then another layer can be prepared disposed thereon.

Optionally, a method for manufacturing the radiative cooling functional coating material may include: preparing raw materials such as the resin, the granular filler, and the additive and/or solvent; pre-dispersing the raw materials at high speed, grinding and dispersing the raw materials; then uniformly stirring; filtering and testing; and finally packaging, to obtain the radiative cooling functional coating material.

The present disclosure can also provide a selective radiative cooling coating layer including the radiative cooling functional layer manufactured by the radiative cooling functional coating material.

Optionally, in the radiative cooling functional layer, a weight ratio of the granular filler to the radiative cooling functional resin can be in a range of 1:10 to 6:1. The weight ratio of the granular filler to the radiative cooling functional resin is the mass ratio of the granular filler to the solid resin in the radiative cooling functional coating material. If a weight ratio of the granular filler to the radiative cooling functional resin is reduced, the mechanical strength and weather resistant of the radiative cooling functional coating material can be improved. Considering the possible improvement of reflectivity and emissivity and the cost, the weight ratio of the granular filler to the radiative cooling functional resin can be preferably in a range of 1:5 to 3:1, and more preferably, in a range of 1:3 to 3:1.

In some embodiments, the radiative cooling functional layer can include two or more layers, for example, including a first radiative cooling functional layer made of a first radiative cooling functional coating material and a second radiative cooling functional layer made of a second radiative cooling functional coating material. The first radiative cooling functional layer can have the property of reflecting visible light and near-infrared light and emitting heat by the infrared radiation of the atmospheric window. The second radiative cooling functional layer can have the property of reflecting the ultraviolet light and the visible light and emitting heat in the form of infrared radiation through the atmospheric window.

Optionally, the visible light and near-infrared reflectivity of the first radiative cooling functional layer can be greater than or equal to 80%, and the emissivity in the wave range of 7 µm to 14 µm of the first radiative cooling functional layer can be greater than or equal to 80%. The visible and ultraviolet reflectivity of the second radiative cooling functional layer can be greater than or equal to 80%, and the emissivity in the wave range of 7 µm to 14 µm of the second radiative cooling functional layer can be greater than or equal to 80%. Furthermore, the visible light and near-infrared reflectivity of the first radiative cooling functional layer can be greater than or equal to 90%, and the emissivity in the wave range of 7 µm to 14 µm of the first radiative cooling functional layer can be greater than or equal to 90%; the visible and ultraviolet reflectivity of the second radiative cooling functional layer can be greater than or equal to 90%, and the emissivity of waves in the range of 7 µm to 14 µm of the second radiative cooling functional layer can be greater than or equal to 90%.

In another embodiment, the radiative cooling functional layer may also be one layer and not be divided into two layers. The radiative cooling functional layer can include the first granular filler and the second granular filler. That is, the first radiative cooling functional layer and the second radiative cooling functional layer may be combined into one layer.

Optionally, the infrared emissivity (in the wave range of 7 µm to 14 µm) of the radiative cooling functional layer can be greater than or equal to 80%, and the heat reflectivity (in the wave range of 300 nm to 2500 nm) of the radiative cooling functional layer can be greater than or equal to 80%. Furthermore, the infrared emissivity (in the wave range of 7 µm to 14 µm) of the radiative cooling functional layer can be greater than or equal to 90%, and the heat reflectivity (in the wave range of 300 nm to 2500 nm) of the radiative cooling functional layer can be greater than or equal to 90%.

In some other embodiments, the selective radiative cooling coating layer may further include a weather resistant resin layer and/or a primer resin layer. The radiative cooling functional layer can include a first surface and a second surface away from the first surface. The weather resistant resin layer can be disposed on the first surface of the radiative cooling functional layer for protecting the radiative cooling functional layer. The primer resin layer can be disposed on the second surface of the radiative cooling functional layer for contacting a substrate or a main body, such that the selective radiative cooling coating layer can be disposed on the substrate or the main body.

In order to obtain great weather resistance and stain resistance, the material of the weather resistant resin layer may be a fluorine-containing resin including a fluorocarbon resin (FEVE), a polyvinylidene fluoride (PVDF) resin, or an ethylene-tetrafluorocarbon. Ethylene copolymer (ETFE) resin, fluorinated ethylene propylene copolymer (FEP) resin, fluorine-containing acrylic resin, fluorine-containing polyester, fluorine-containing epoxy resin, fluorine-containing polyurethane, fluorine-containing silicone resin, and so on. Alternatively, the material of the weather resistant resin layer may be other common weather resistant resins, such as epoxy resin, polyester, polyurethane resin, acrylic resin, silicone resin, and so on. Furthermore, the transmittance of the weather resistant resin layer 4 at a wave range of 300 nm to 2500 nm should be greater than or equal to 80%, so that the reflectivity of the radiative cooling functional layer to the sunlight will not be affected.

The primer resin layer can play roles of enhancing adhesion and anti-corrosion, and the material of the primer resin layer may be selected according to the type of the substrate, and can be an epoxy resin, an acrylic resin, or a combination thereof.

Optionally, a thickness of the radiative cooling functional layer can be in a range of 10 µm to 360 µm, 30 µm to 300 µm, 100 µm to 300 µm, or 100 µm to 150 µm. A thickness of the first radiative cooling functional layer can be in a range of 30 µm to 300 µm, 100 µm to 300 µm, or 100 µm to 150 µm. A thickness of the second radiative cooling functional layer can be in a range of 10 µm to 60 µm, 15 µm to 60 µm or 15 µm to 30 µm. A thickness of the weather resistant resin layer can be in a range of 10 µm to 50 µm. A thickness of the primer resin layer can be in a range of 10 µm to 50 µm.

Referring to FIG. 4a to FIG. 4e, selective radiative cooling coating layers with various structures are illustrated and may include all or part of following layers from bottom to top, respectively.

Referring to FIG. 4a to FIG. 4e, various structures of the selective radiative cooling coating layers of the present disclosure are further described in detail and the granular filler can be in the rod shape. A microscopic enlarged view of the granular filler in the rod shape is shown in FIG. 3.

Figure 4A:
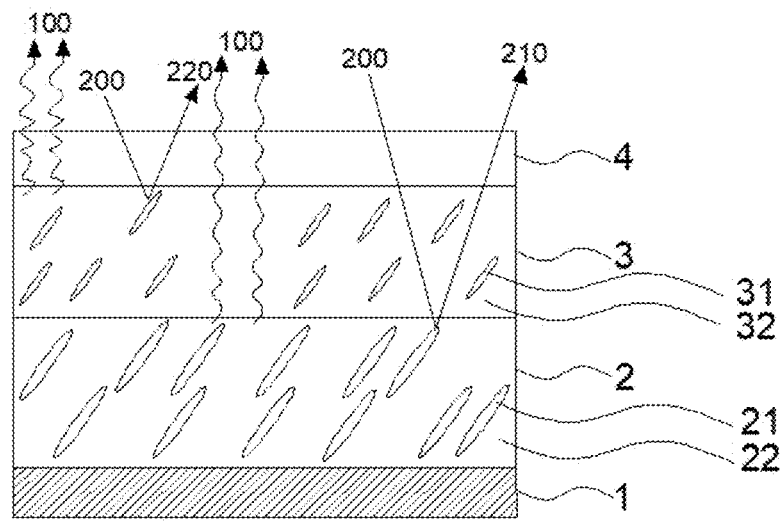
FIG. 4a is a cross-sectional view of a first selective radiative cooling coating layer in an embodiment of the present disclosure, the first selective radiative cooling coating layer including four layers from bottom to top which are respectively a primer resin layer 1, a first radiative cooling functional layer 2, a second radiative cooling functional layer 3, and a weather resistant resin layer 4, and a first granular filler 21 and a second granular filler 31 are in an ordered arrangement.

Referring to FIG. 4a, in some embodiments, the selective radiative cooling coating layer with a first type may include a primer resin layer 1, a first radiative cooling functional layer 2, a second radiative cooling functional layer 3, and a weather resistant resin layer 4 in order from bottom to top. The first radiative cooling functional layer 2 can include a first radiative cooling functional resin layer 22 and a first granular filler 21 distributed in the first radiative cooling functional resin layer 22. The second radiative cooling functional layer 3 can include a second radiative cooling functional resin layer 32 and a second granular filler 31 distributed in second radiative cooling functional resin layer 32. Both the first granular filler 21 and the second granular filler 31 can be orderly distributed in the first radiative cooling functional resin layer 22 and the second radiative cooling functional resin layer 32.

In FIG. 4a, 100 denotes an infrared radiation, 200 denotes solar energy, 210 denotes reflection of the visible light and the near-infrared light, and 220 denotes reflection of the ultraviolet light and the visible light.

Figure 4B:
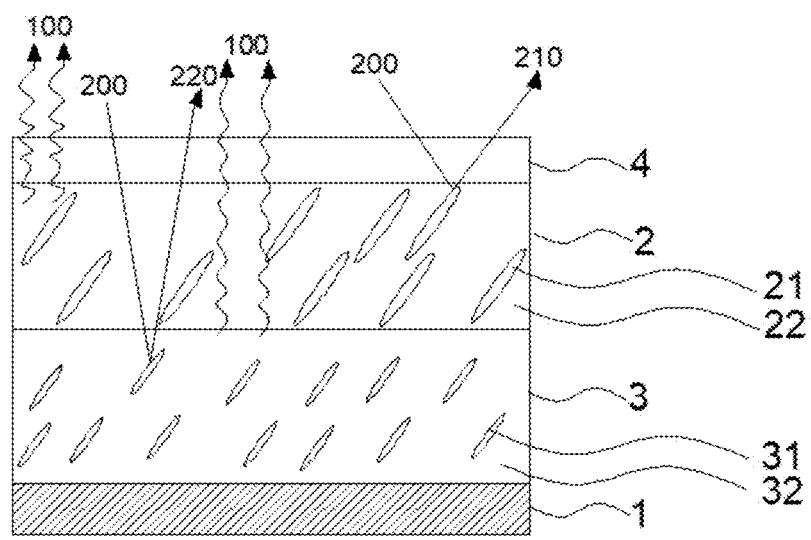
FIG. 4b is a cross-sectional view of a second selective radiative cooling coating layer in another embodiment of the present disclosure, the second selective radiative cooling coating layer including four layers from bottom to top is different from the structure shown in FIG. 4a in that positions of the first radiative cooling functional layer 2 and the second radiative cooling functional layers 3 are exchanged.

Referring to FIG. 4b, in some embodiments, the selective radiative cooling coating layer with a second type may include a primer resin layer 1, a second radiative cooling functional layer 3, a first radiative cooling functional layer 2, and a weather resistant resin layer 4 in order from bottom to top.

Different from the structure shown in FIG. 4a, the order of the first radiative cooling functional layer 2 and the second radiative cooling functional layers 3 in FIG. 4b is exchanged.

Figure 4C:
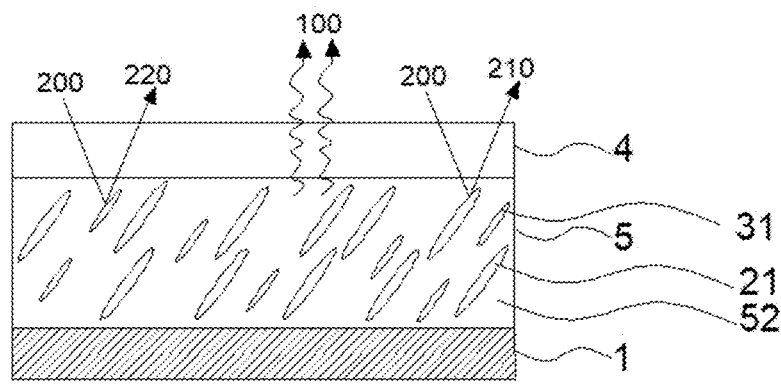
FIG. 4c is a cross-sectional view of a third selective radiative cooling coating layer in another embodiment of the present disclosure, the third selective radiative cooling coating layer including three layers from bottom to top is different from the structure shown in FIG. 4a in that the first radiative cooling functional layer 2 and the second radiative cooling functional layer 3 are combined into one layer.

Referring to FIG. 4c, in some embodiments, the selective radiative cooling coating layer with a third type may include a primer resin layer 1, a radiative cooling functional layer 5, and a weather resistant resin layer 4 in order from bottom to top. The radiative cooling functional layer 5 can include a radiative cooling functional resin layer 52, a first granular filler 21 and a second granular filler 31, and the first granular filler 21 and the second granular filler 31 can be distributed in the radiative cooling functional resin layer 52.

Different from the structure shown in FIG. 4a, the first radiative cooling functional layer 2 and the second radiative cooling functional layer 3 are combined into one layer, that is, the radiative cooling functional layer 5 in FIG. 4c.

Figure 4D:
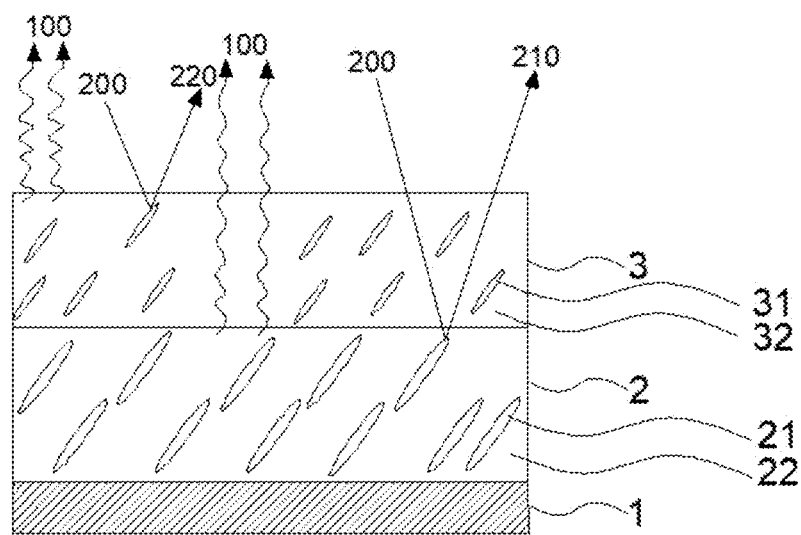
FIG. 4d is a cross-sectional view of a fourth selective radiative cooling layer in another embodiment of the present disclosure, the fourth selective radiative cooling layer including three layers from bottom to top is different from the structure shown in FIG. 4a in that one layer of weather resistant resin layer is omitted.

Referring to FIG. 4d, in some embodiments, the selective radiative cooling coating layer with a fourth type may include a primer resin layer 1, a first radiative cooling functional layer 2, and a second radiative cooling functional layer 3 in order from bottom to top.

Different from the structure shown in FIG. 4a, the weather resistant resin layer 4 is omitted in FIG. 4d.

Figure 4E:
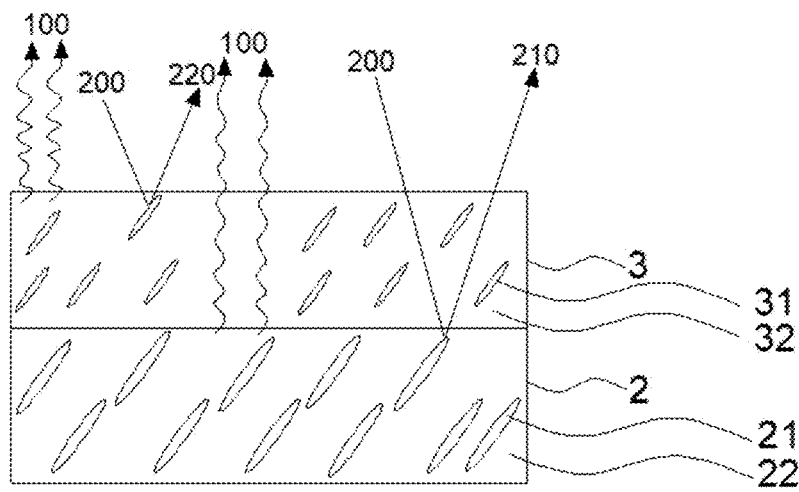
FIG. 4e is a cross-sectional view of a fifth selective radiative cooling coating layer in another embodiment of the present disclosure, the fifth selective radiative cooling coating layer including two layers from bottom to top is different from the structure shown in FIG. 4a in that the primer resin layer 1 and the weather resistant resin layer 4 are omitted.

Referring to FIG. 4e, in some embodiments, the selective radiative cooling coating layer with a fifth type may include a first radiative cooling functional layer 2 and a second radiative cooling functional layer 3 in order from bottom to top.

Different from the structure shown in FIG. 4a, the weather resistant resin layer 4 and the primer resin layer 1 are omitted in FIG. 4e.

In addition, the first granular filler 21 and the second granular filler 31 can be randomly distributed in the radiative cooling functional resin. However, the randomly distribution of the first granular filler 21 and the second granular filler 31 may affect reflectivity of ultraviolet light and/or visible light and/or near-infrared light and emissivity in the wave range of 7 μm to 14 μm of the radiative cooling functional layer.

It should be noted that the selective radiative cooling coating layers shown in FIGS. 4a to 4e are only some embodiments of the present disclosure in which the weather resistant resin layer and/or the primer resin layer may be omitted, the first radiative cooling functional layer and the second radiative cooling functional layer may be combined into one layer, or the first radiative cooling functional layer and the second radiative cooling functional layer may be reversed. The number of the radiative cooling functional layers is not limited and can be one, two, three, four, five and the like. A type and weight ratio of the granular filler, a type and weight ratio of the resin, the thickness of the radiative cooling functional layer, and the material and thickness of other layers can be selected as needed. The selective radiative cooling coating layer can be optimized by materials and structure to improve the heat reflectivity and emissivity, especially the emissivity in the wave range of 7 μm to 14 μm, achieving extremely excellent cooling effect.

The selective radiative cooling coating layer of the present disclosure has a reflectivity of the solar spectral energy which is greater than or equal to 80% and an atmospheric window emissivity that is larger than or equal to 80%, and is able to provide a radiative cooling power of lager than or equal to 100 W/m$^2$ at room temperature. The selective radiative cooling coating layer also has the properties of high mechanical strength and good weather resistance and has practical value. For the test of radiative cooling power, one can refer to the article "Supplementary Material for Scalable-manufactured randomized glass-polymer hybrid metamaterial for daytime radiative cooling" in the journal "Science" in 2017, and the "silver-coated silicon wafer" and "hybrid metamaterial" can be replaced by the radiative cooling coating material of the present disclosure.

The selective radiative cooling coating layer of the present disclosure has many advantages.

Firstly, the selective radiative cooling coating layer has a layered structure and each layer has different functions, such that it is convenient for preparation and application.

Secondly, when the radiative cooling functional layer includes the first radiative cooling functional layer and the second radiative cooling functional layer, each of which has selective reflection and emission effects, and can be separately prepared and selective used.

Thirdly, the granular filler can be mainly in the rod shape with a special ratio of the length to the diameter and arranged in an order in the resin of the radiative cooling functional layer to have better performance.

Fourthly, the primer resin layer can be configured for increasing the adhesion between the radiative cooling functional layer and the substrate.

The present disclosure further provides a composite material including a selective radiative cooling coating layer. The composite material can include a substrate. The selective radiative cooling coating layer can be disposed on the substrate.

The substrate can be one of metal, plastic, rubber, concrete, cement, asphalt, paper, textile, wood, ceramic tile, glass or organic synthetic material.

The radiative cooling functional coating material in different embodiments of the present disclosure and its application are described above. Corresponding experimental data and engineering applications are also provided below to further describe the performance of the radiative cooling functional coating material and its cooling effect.

[Experiment]

(1) Reflectivity Test

A sample was placed in a photometer, such as Perkin Elmer, Lambda 950 UV/Vis/NIR Spectrometer, and a reflectivity of the sample can be measured in a wave range of 300 nm to 2500 nm, 300 nm to 400 nm, 400 nm to 760 nm, 760 nm to 2500 nm at a wavelength interval of 5 nm. An average value of the reflectivity of the sample in the wave range of 300 nm to 2500 nm, 300 nm to 400 nm, 400 nm to 760 nm, and 760 nm to 2500 nm was respectively taken as the reflectivity of the sample in the solar, ultraviolet, visible, and near-infrared bands, which is shown as R, R1, R2, and R3, respectively.

(2) Emissivity Test

The infrared emissivity in the wave range of 7 to 14 μm was tested using a reflectometer such as a SOC-100 Hemispherical Directional Reflectometer.

Figure 5A:
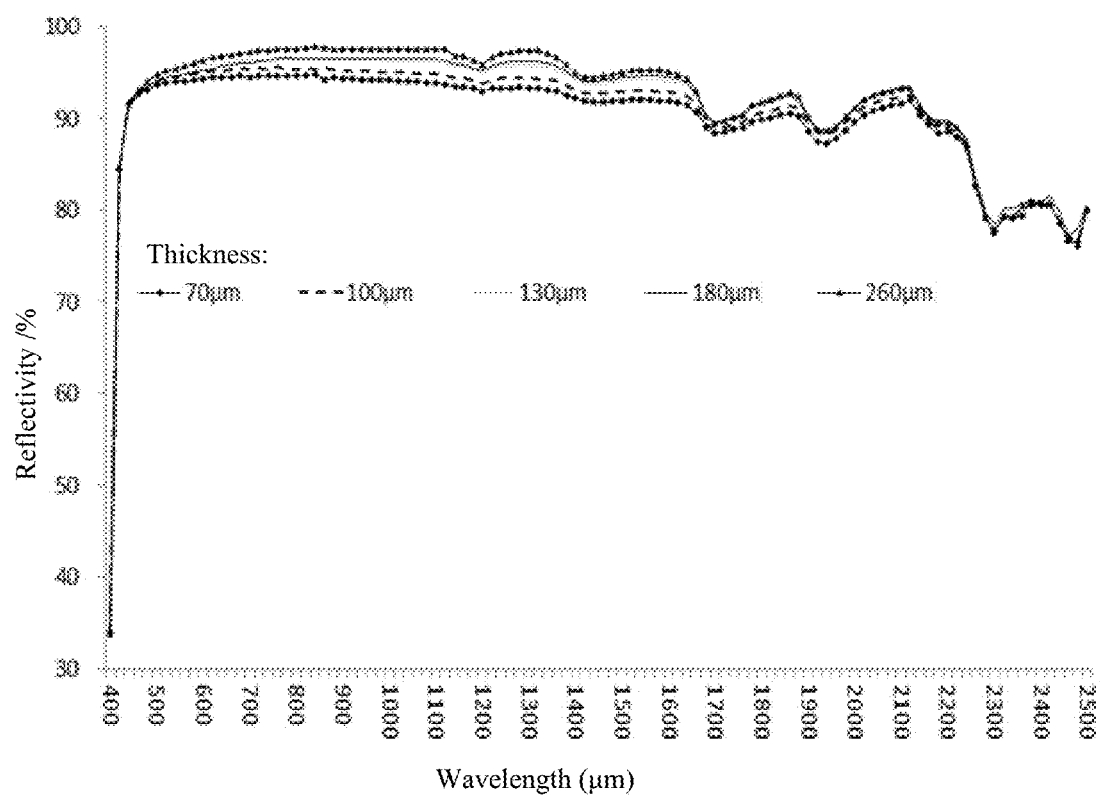
FIG. 5a is a relational graph between a thickness of the first radiative cooling functional layer and the reflectivity in the wave range of 400 nm to 760 nm and 760 nm to 2500 nm. The reflectivity of the first radiative cooling functional layer 2 was related to its thickness, and the thicker the thickness, the higher the reflectivity. When the thickness was greater than or equal to 130 µm, the reflectivity increased slowly and substantially reached to saturation.
Figure 5B:
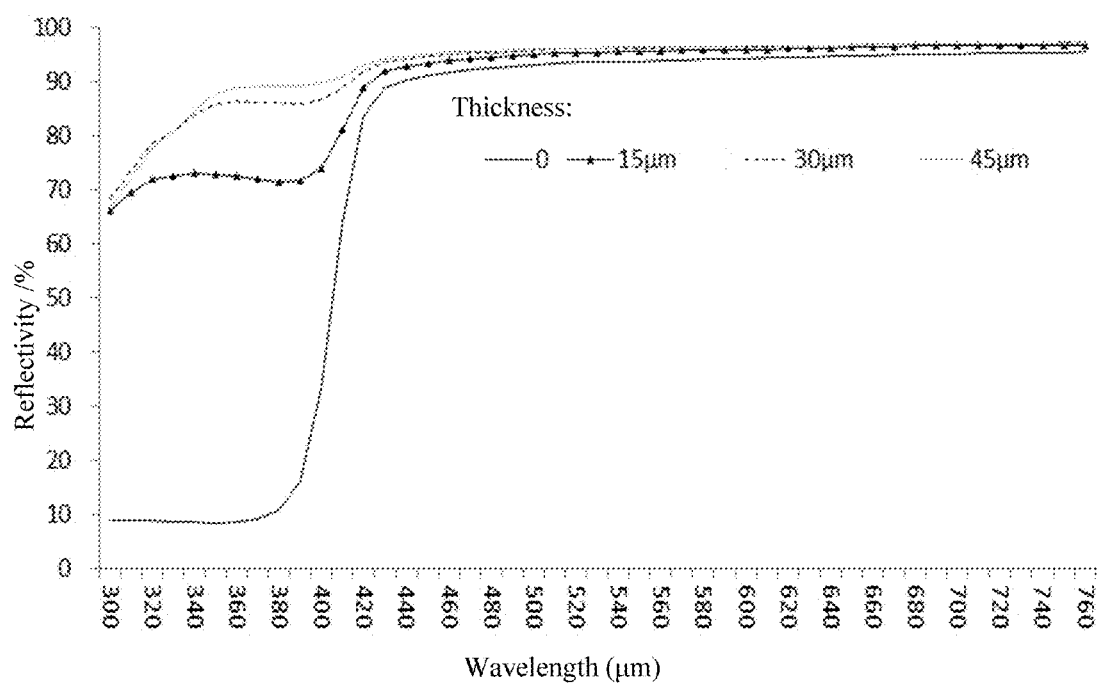
FIG. 5b is a relational graph between a thickness of between the second radiative cooling functional layer and the reflectivity in the wave range of 300 nm to 400 nm, 400 nm to 760 nm. The reflectivity of the second radiative cooling functional layer 3 was related to its thickness, and the thicker the thickness was, the higher the reflectivity was. When the thickness was greater than or equal to 30 µm, the reflectivity increased slowly and substantially reached saturation.
Figure 6A:
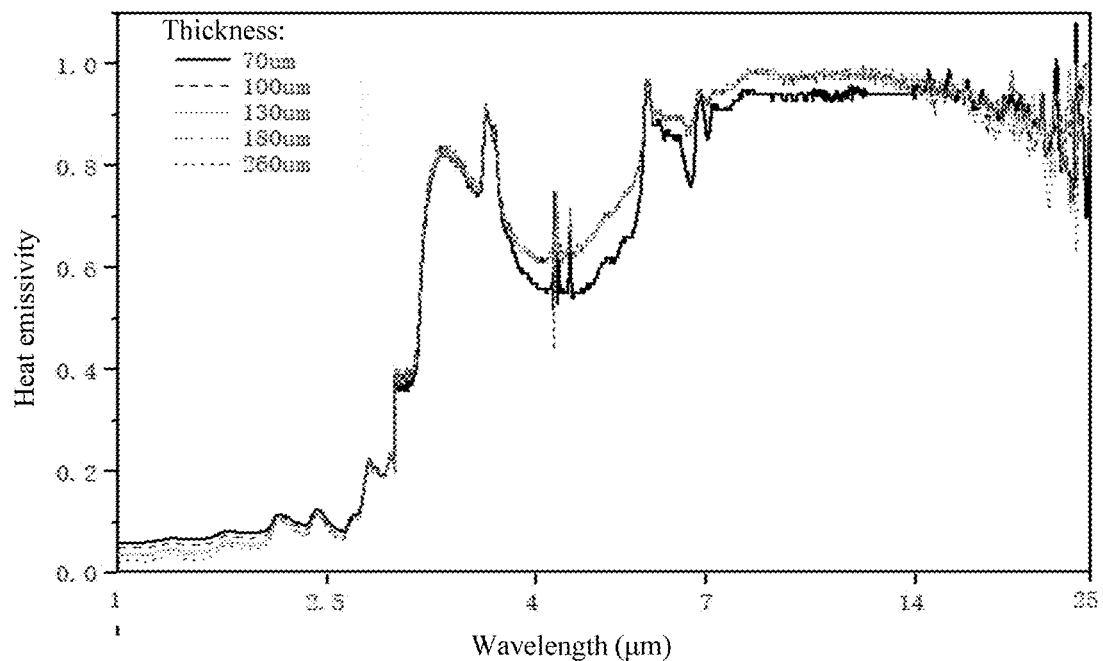
FIG. 6a is a relational graph of the thickness of the first radiative cooling functional layer and the emissivity in the wave range of 1 µm to 25 µm. The emissivity of the first radiative cooling functional layer 2 in the wave range of 7 µm to 14 µm was related to the thickness of the first radiative cooling functional layer 2. The thicker the thickness, the higher the emissivity, and when the thickness was greater than or equal to 100 µm, the emissivity increased slowly and substantially reached saturation
Figure 6B:
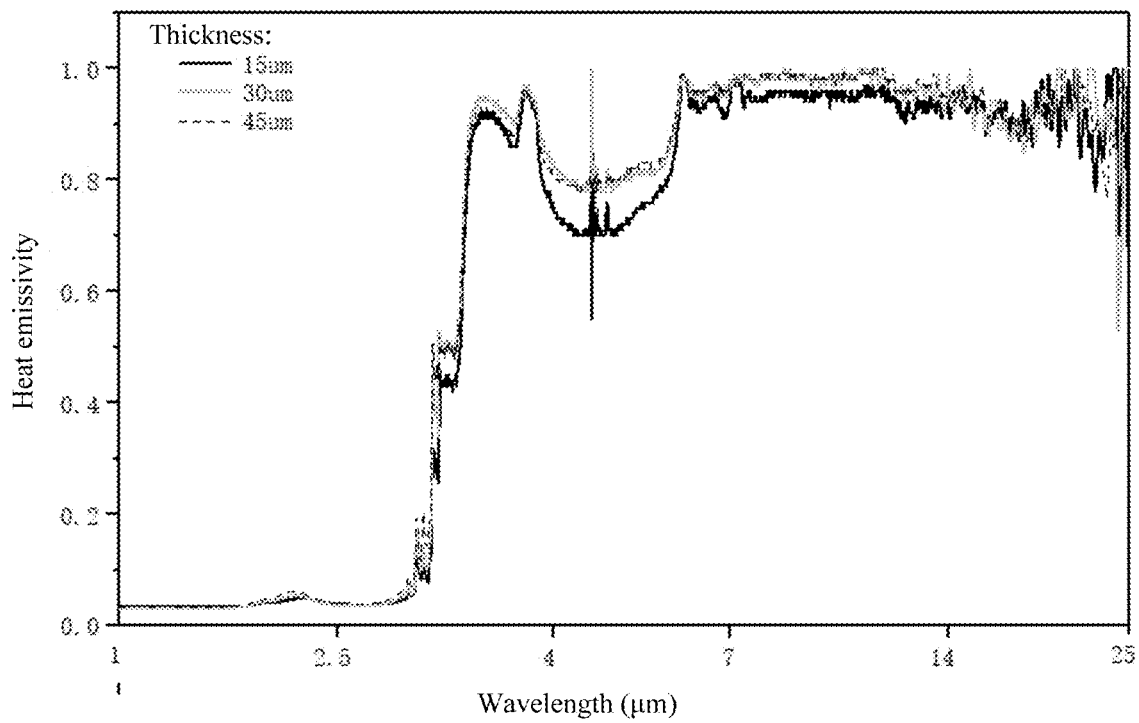
FIG. 6b is a relational graph of the thickness of the second radiative cooling functional layer and the emissivity in the range of 1 µm to 25 µm. The emissivity of the second radiative cooling functional layer 3 in the wave range of 7 µm to 14 µm was related to the thickness of the first radiative cooling functional layer. The thicker the thickness, the higher the emissivity, and when the thickness was greater than or equal to 15 µm, the emissivity increased slowly and substantially reached saturation.

About thickness, FIG. 5a shows a relationship between the thickness of the first radiative cooling functional layer and the reflectivity in the wave range of 400 nm to 760 nm and 760 nm to 2500 nm. FIG. 5b shows a relationship between the thickness of the second radiative cooling functional layer and the reflectivity in the wave range of 300 nm to 400 nm, 400 nm to 760 nm. FIG. 6a shows a relationship of the thickness of the first radiative cooling functional layer and the emissivity in a wave range of 1 μm to 25 μm. FIG. 6b shows a relationship between the thickness of the second radiative cooling functional layer and the emissivity in the wave range of 1 μm to 25 μm. The results were as below.

The first radiative cooling functional coating material having a formula X was coated on a galvanized sheet and dried to obtain first radiative cooling functional layers of different thickness, such as about 70 μm, 100 μm, 130 μm, 180 μm, 260 μm, respectively. The formula X was that the first radiative cooling functional coating material included about 80% weight ratio acrylic resin, about 19% weight ratio silicon dioxide and calcium carbonate powder, and about 1% weight ratio the directional agent (ethylene-vinyl acetate copolymer wax emulsion). A mass ratio of silicon dioxide and calcium carbonate powder was about 1:1, the silicon dioxide and the calcium carbonate powder were rod-shaped, the particle diameter of each was about 6 μm, and the ratio of the length to the diameter of each was about 5:1. An angle between the surface of the first radiative cooling functional layer and the length of the silicon dioxide and the calcium carbonate powder was in a range of 0 degree to 30 degrees. Referring to FIG. 5a, it can be concluded that the average reflectivity of the first radiative cooling functional layer was related to its thickness, and the thicker the thickness was, the higher the reflectivity was. When the thickness was greater than or equal to 130 µm, the reflectivity increased slowly and substantially reached saturation. According to FIG. 6a, the average emissivity of the first radiative cooling functional layer in the wave range of 7 µm to 14 µm was related to the thickness of the first radiative cooling functional layer. The thicker the thickness, the higher the emissivity, and when the thickness was greater than or equal to 100 µm, the emissivity increased slowly and substantially reached saturation.

A second radiative cooling functional coating material having a formula Y was coated on the galvanized sheet having the second radiative cooling functional layer with the thickness of about 50 µm (the formula X) and dried to obtain second radiative cooling functional layers of different thickness, such as about 0 µm, 15 µm, 30 µm, 45 µm, respectively. The formula Y was that the second radiative cooling functional coating material included about 75% weight ratio polyurethane resin, about 23% weight ratio aluminum oxide and magnesium oxide, and about 2% weight ratio directional agent (polyamide wax). A mass ratio of the aluminum oxide and the magnesium oxide was about 1:1, the aluminum oxide and the magnesium oxide were rod-shaped, the particle size of each was about 3 µm, the ratio of the length to the diameter of each was about 6:1. An angle in a range of 0 degree to 30 degrees was formed between the surface of the second radiative cooling functional layer and the length of the aluminum oxide and the magnesium oxide. According to FIG. 5b, it can be concluded that the reflectivity of the second radiative cooling functional layer was related to its thickness, and the thicker the thickness was, the higher the reflectivity was. When the thickness was greater than or equal to 30 µm, the reflectivity increased slowly and substantially reached saturation. According to FIG. 6b, the emissivity of the second radiative cooling functional layer in the wave range of 7 µm to 14 µm was related to the thickness of the first radiative cooling functional layer. The thicker the thickness was, the higher the emissivity was, and when the thickness was greater than or equal to 15 µm, the emissivity increased slowly and substantially reached saturation.

Compared with the formula X, the shape of the granular filler can be different. The shapes of the granular filler of the samples were rod, ellipsoid, spherical, cuboid, and cube, respectively. The thickness of the samples of the first radiative cooling functional layer was 80 µm, and the average reflectivity in the wave range of 400 nm to 2500 nm and the average emissivity in the wave range of 7 µm to 14 µm of the samples after drying were tested. The result was that the average reflectivity of the first radiative cooling functional layer in the wave range of 400 nm to 2500 nm and the average emissivity in the wave range of 7 µm to 14 µm were related to the shape of the granular filler, and in such order from large to small: rod>(ellipsoid and spherical)>(cuboid and cube).

Compared with the formula Y, the shape of the granular filler can be different. The shape of the granular filler of the samples were rod, ellipsoid, spherical, cuboid, and cube, respectively. The second radiative cooling functional coating material was coated on the galvanized sheet having the first radiative cooling functional layer with the thickness of about 150 µm (the formula X) and dried to obtain samples of the second radiative cooling functional layers. The thickness of the samples was about 30 µm, and the average reflectivity in the wave range of 300 nm to 760 nm and the average emissivity in the wave range of 7 µm to 14 µm of the samples after drying were tested. The result was that the average reflectivity of the second radiative cooling functional layer in the wave range of 300 nm to 760 nm and the average emissivity in the wave range of 7 µm to 14 µm were related to the shape of the granular filler, and in such order from large to small: rod>(ellipsoid and spherical)>(cuboid and cube).

Compared with the formula X, the ratio of the length to the diameter of the granular filler can be different. The ratio of the length to the diameter of the granular filler of the samples was about 3:1, 4:1, 6:1, 8:1, 9:1, respectively. The thickness of the layers was 100 µm, and the average reflectivity in the wave range of 400 nm to 2500 nm and the average emissivity in the wave range of 7 µm to 14 µm of the samples after drying were tested. The result was that the average reflectivity of the first radiative cooling functional layer in the wave range of 400 nm to 2500 nm and the average emissivity in the wave range of 7 µm to 14 µm were related to the ratio of the length to the diameter of the granular filler, and in such order from large to small: (4:1 and 6:1)>(8:1 and 3:1)>9:1.

Compared with the formula Y, the ratio of the length to the diameter of the granular filler can be different. The ratio of the length to the diameter of the granular filler of the samples was about 3:1, 4:1, 6:1, 8:1, 9:1, respectively. The second radiative cooling functional coating material was coated on the galvanized sheet having the first radiative cooling functional layer with the thickness of about 150 µm (the formula X) and dried to obtain samples of the second radiative cooling functional layers. The thickness of the samples was 30 µm, and the average reflectivity in the wave range of 300 nm to 760 nm and the average emissivity in the wave range of 7 µm to 14 µm of the samples after drying were tested. The result was that the average reflectivity of the second radiative cooling functional layer in the wave range of 300 nm to 760 nm and the average emissivity in the wave range of 7 µm to 14 µm were related to the ratio of the length to the diameter of the granular filler, and in such order from large to small: (4:1 and 6:1)>(8:1 and 3:1)>9:1.

Compared with the formula X, the volume average diameter of the granular filler can be different. The volume average diameter of the samples was about 0.5 µm, 1 µm, 2 µm, 6 µm, 20 µm, 40 µm, and 43 µm, respectively. The thickness of the samples of the first radiative cooling functional layer was 120 µm, and the average reflectivity in the wave range of 400 nm to 2500 nm and the average emissivity in the wave range of 7 µm to 14 µm of the samples after drying were tested. The result was that the average reflectivity of the first radiative cooling functional layer in the wave range of 400 nm to 2500 nm and the average emissivity in the wave range of 7 µm to 14 µm were related to the volume average particle diameter of the granular filler, and in such order from large to small: (2 µm and 6 µm)>(1 µm and 20 µm)>(0.5 µm and 40 µm)>43 µm.

Compared with the formula Y, the volume average diameter of the granular filler was different. The particle diameters of the samples were 0.5 µm, 1 µm, 2 µm, 6 µm, 20 µm, 40 µm, and 43 µm, respectively. The second radiative cooling functional coating material was coated on the galvanized sheet having the first radiative cooling functional layer with the thickness of 150 µm (the formula X) and dried to obtain samples of the second radiative cooling functional layers. The thickness of the samples was 30 µm, and the average reflectivity in the wave range of 300 nm to 760 nm and the average emissivity in the wave range of 7 µm to 14 µm of the samples after drying were tested. The result was that the average reflectivity of the second radiative cooling functional layer in the wave range of 300 nm to 760 nm and the average emissivity in the wave range of 7 µm to 14 µm were related to the volume average particle diameter of the granular filler, and in such order from large to small: (2 µm and 6 µm)>(1 µm and 20 µm)>(0.5 µm and 40 µm)>43 µm.

Compared with the formula X, directionally alignment of the granular filler can be different. The angle between the surface of the first radiative cooling functional layer and the length of the silicon dioxide and the calcium carbonate powder of the samples were in a range of 0 degree to 45 degrees, in a range of 0 degree to 30 degrees, and disordered arrangement, respectively. The thickness of the samples of the first radiative cooling functional layer was 120 µm, and the average reflectivity in the wave range of 400 nm to 2500 nm and the average emissivity in the wave range of 7 µm to 14 µm of the samples after drying were tested. The result was that the average reflectivity of the first radiative cooling functional layer in the wave range of 400 nm to 2500 nm and the average emissivity in the wave range of 7 µm to 14 µm were related to the directionally alignment of the granular filler, and in such order from large to small: in the range of 0 degree to 30 degrees>in the range of 0 degree to 45 degrees>disordered arrangement.

Different from the formula Y, the angle between the surface of the first radiative cooling functional layer and the length of the silicon dioxide and the calcium carbonate powder can be in a range of 0 degree to 45 degrees, in a range of 0 degree to 30 degrees, and disordered arrangement. The second radiative cooling functional coating material was coated on the galvanized sheet having the first radiative cooling functional layer with the thickness of 150 µm (the formula X) and dried to obtain samples of the second radiative cooling functional layers. The thickness of the samples was about 30 µm, and the average reflectivity in the wave range of 300 nm to 760 nm and the average emissivity in the wave range of 7 µm to 14 µm of the samples after drying were tested. The result was that the average reflectivity of the second radiative cooling functional layer in the wave range of 300 nm to 760 nm and the average emissivity in the wave range of 7 µm to 14 µm were related to the directionally alignment of the granular filler, and in such order from large to small: in the range of 0 degree to 30 degrees>in the range of 0 degree to 45 degrees>disordered arrangement.

Compared with the formula X, the material of the granular fillers can be different. The material of the granular fillers can be pearl powder, silicon dioxide, aluminum oxide and magnesium oxide. The thickness of the samples of the first radiative cooling functional layer was 80 µm, and the average reflectivity in the wave range of 400 nm to 2500 nm and the average emissivity in the wave range of 7 µm to 14 µm of the samples after drying were tested. The result was that the average reflectivity of the first radiative cooling functional layer in the wave range of 400 nm to 2500 nm and the average emissivity in the wave range of 7 µm to 14 µm were related to the material of the granular filler, and in such order from large to small: (pearl powder and silicon dioxide) >(aluminum oxide and magnesium oxide).

Compared with the formula Y, the material of the granular fillers can be different. The material of the granular fillers was silicon dioxide and calcium carbonate powder with a weight ratio of about 1:1, magnesium oxide and aluminum oxide, respectively. The second radiative cooling functional coating material was coated on the galvanized sheet having the first radiative cooling functional layer with the thickness of about 150 µm (the formula X) and dried to obtain samples of the second radiative cooling functional layers. The thickness of the samples was about 40 µm, and the average reflectivity in the wave range of 300 nm to 760 nm and the average emissivity in the wave range of 7 µm to 14 µm of the samples after drying were tested. The result was that the average reflectivity of the second radiative cooling functional layer in the wave range of 300 nm to 760 nm and the average emissivity in the wave range of 7 µm to 14 µm were related to the material of the granular filler, and in such order from large to small: (magnesium oxide and aluminum oxide) >silicon dioxide and calcium carbonate powder with a weight ratio of about 1:1.

Compared with the formula X, the material of the resins was different. The material of the resins was epoxy resin, polyester, polyurethane resin, acrylic resin, silicone resin and fluorine resin, respectively. The thickness of the samples of the first radiative cooling functional layer was about 80 µm, and the average reflectivity in the wave range of 400 nm to 2500 nm and the average emissivity in the wave range of 7 µm to 14 µm of the samples after drying were tested. The result was that the average reflectivity of the first radiative cooling functional layer in the wave range of 400 nm to 2500 nm and the average emissivity in the wave range of 7 µm to 14 µm were related to the material of the resin, and in such order from large to small: (epoxy resin, polyester, polyurethane resin, acrylic resin and silicone resin)>fluorine resin.

Compared with the formula Y, the material of the resins was different. The material of the resins was epoxy resin, polyester, polyurethane resin, acrylic resin, silicone resin and fluorine resin, respectively. The second radiative cooling functional coating material was coated on the galvanized sheet having the first radiative cooling functional layer with the thickness of about 150 µm (the formula X) and dried to obtain samples of the second radiative cooling functional layers. The thickness of the samples was about 40 µm, and the average reflectivity in the wave range of 300 nm to 760 nm and the average emissivity in the wave range of 7 µm to 14 µm of the samples after drying were tested. The result was that the average reflectivity of the second radiative cooling functional layer in the wave range of 300 nm to 760 nm and the average emissivity in the wave range of 7 µm to 14 µm were related to the material of the resin, and in such order from large to small: (epoxy resin, polyester, polyurethane resin, acrylic resin and silicone resin)>fluorine resin.

Compared with the formula X, the weight ratio of the granular filler to the resin can be different. The weight ratios of the granular filler to the resin of the samples were about 10:89, 25:74, 50:49, 60:39, respectively. The thickness of the samples of the first radiative cooling functional layer was about 80 µm, and the average reflectivity in the wave range of 400 nm to 2500 nm and the average emissivity in the wave range of 7 µm to 14 µm of the samples after drying were tested. The result was that the average reflectivity of the first radiative cooling functional layer in the wave range of 400 nm to 2500 nm and the average emissivity in the wave range of 7 µm to 14 µm were related to the weight ratio of the granular filler to the resin, and in such order from large to small: 25:74>10:89>50:49>60:39.

Compared with the formula Y, the weight ratio of the granular filler to the resin can be different. The weight ratios of the granular filler to the resin of the samples were about 10:89, 25:74, 50:49, 60:39, respectively. The second radiative cooling functional coating material was coated on the galvanized sheet having the first radiative cooling functional layer with the thickness of about 150 µm (the formula X) and dried to obtain samples of the second radiative cooling functional layers. The thickness of the samples was about 40 µm, and the average reflectivity in the wave range of 300 nm to 760 nm and the average emissivity in the wave range of 7 µm to 14 µm of the samples after drying were tested. The result was that the average reflectivity of the second radiative cooling functional layer in the wave range of 300 nm to 760 nm and the average emissivity in the wave range of 7 μm to 14 μm were related to the weight ratio of the granular filler to the resin, and in such order from large to small: 25:74>10:89>50:49>60:39.

(3) Weather Resistance Test (1) Xenon lamp test sample preparation: selective radiative cooling coating layers were formed by coating the radiative cooling functional coating material on a 150 mm*70 mm*4 mm non-asbestos fiber cement board and included the primer resin layer (acrylic resin), the first radiative cooling functional layer (having the formula X), the second radiative cooling functional layer (having the formula Y), and the weather resistant resin layer, from the bottom to the top in order. The primer resin layer, the first radiative cooling functional layer and the second radiative cooling functional layer of the sample were the same. The weather resistant resin layer of the samples was separately provided as a fluorocarbon resin (FEVE), a polyvinylidene fluoride (PVDF) resin, an ethylene-tetrafluoroethylene copolymer (ETFE) resin, and a fluorine-containing silicone resin. After coating respectively by the wire rods with the size of about 120 μm and about 80 μm in one time and curing for about 168 hours for each layer, sample 1, sample 2, sample 3, and sample 4 were obtained.

Test Equipment is Xenon Lamp Tester.

Test conditions: temperature of blackboard was 55±2 degrees centigrade, humidity was about 70% RH, rainfall was about 18 min/2 h, power was about 550 W/m$^2$, and time of being placed was about 1000 h. The appearance, chalking and discoloration before and after aging were observed, and the average reflectivity (in the wave range of 300 nm to 2500 nm) changed before and after aging ΔR (reflectivity before aging minus reflectivity after aging) and average emissivity (in the wave range of 7 μm to 14 μm) change ΔE (emissivity before aging minus emissivity after aging) were tested.

Results of Xenon Lamp Test were that sample 1, sample 2, sample 3, sample 4 had no obvious change of appearance, chalking and discoloration before and after aging, the changes of reflectivity ΔR of all of the samples were below 2%, and the changes of emissivity ΔE of all of the samples were below 2%.

(2) Temperature Resistant Test

Sample preparation: the first radiative cooling functional coating material (including about 79% acrylic resin, about 20% aluminum silicate, and about 1% polyethylene wax as the directional agent, wherein the aluminum silicate was rod-shaped, had the approximate ratio 4:1 of the length to the diameter, and the particle diameter was about 2 μm) was coated on a non-asbestos fiber cement board with an approximate size of 150 mm*70 mm*4 mm. After coating respectively by the wire rods with the size of 120 μm and 80 μm in one time and curing for 168 hours, sample 5 was obtained.

The second radiative cooling functional coating material (including about 70% silicone resin, about 27% aluminum oxide, and about 3% aqueous acetic acid-butyl cellulose as the directional agent, wherein aluminum oxide is rod shape, was rod-shaped, had the approximate ratio 6:1 of the length to the diameter, and the particle diameter was about 0.6 μm) was coated on a non-asbestos fiber cement board with an approximate size of 150 mm*70 mm*4 mm. After coating respectively by the wire rods with the size of about 120 μm and about 80 μm in one time and curing for about 168 hours, sample 6 was obtained.

The weather resistant resin (fluorinated ethylene propylene copolymer (FEP) resin) was coated on a non-asbestos fiber cement board with an approximate size of 150 mm*70 mm*4 mm. After coating respectively by the wire rods with the size of about 120 μm and about 80 μm in one time and curing for about 168 hours, sample 7 was obtained.

Test procedure: the samples were put into water and soaked for 18 hours, then taken out. Water stains on surface of the samples were dried and placed in a refrigerator and placed at about minus 20 degrees centigrade for about 3 hours. Then the samples were taken out and placed in an oven at about 50 degrees centigrade for about 3 hours. The processing was then taken 5 cycles to observe the change of the surface of the samples. If at least 2 of the 3 samples of each test had no changing, that is, there was no chalking, cracking, blistering, flaking, obvious discoloration, and other film degradation phenomena, the test result of the sample was "no abnormality".

Results of temperature-resistant performance test was sample 5, sample 6, sample 7 were normal, that is, there was no chalking, cracking, blistering, flaking, obvious discoloration and other film degradation phenomena.

(3) Water Resistance Test

The water resistant properties of sample 5, sample 6, and sample 7 were tested.

Test procedure: after immersing in water for 96 hours, the samples were observed whether the surface had phenomena of blistering, powder falling, obvious discoloration and the like.

Results of water resistance test were that the surface of sample 5, sample 6, and sample 7 had no phenomena of blistering, powder falling, obvious discoloration and the like.

(4) Stain resistance test: the stain resistant properties of sample 1, sample 2, sample 3, and sample 4 were tested.

Test Equipment was Coating Stain Resistance Tester.

Pollution source configuration: a standard ash and water suspension with a mass ratio of 1:1 was used.

Test procedure: firstly, the reflectivity of the sample at the upper, middle and lower positions was tested. The average value of the reflectivity was obtained and denoted as P. 0.7±0.1 g of pollution source was brushed on each sample. The samples were dried in an oven at about 60 degrees centigrade for about 30 minutes, taken out and placed for about 2 h. After rinsing with a coating stain resistance tester for about 1 min, the samples were placed for about 24 h. After repeating the above process, the reflectivity of the samples was tested at the upper, middle and lower positions, and the average value was obtained and denoted as Q.

The coating stain resistant was calculated by the reflectivity reduction rate (X) as follows: X=|PQ|/P*100%, and the result was an arithmetic mean of three samples, and two effective values were retained. The average relative error of the three samples should be less than or equal to 15%.

Result of the stain resistant test was that the reflectivity reduction rates (X) of all of sample 1, sample 2, sample 3, and sample 4 were 3% or less than 3%.

(5) Mechanical Properties:

(1) Adhesion Test

The adhesion of sample 5, sample 6, and sample 7 was tested.

Adhesion test: according to the provisions of GB/T 9286-1998, use the samples were respectively cut three lines by a single-edged cutter in parallel and vertical directions along the long edge of the sample, each interval was 3 mm, and the number of grids was 4. Tape tear test was taken.

The results were evaluated on six levels of 0, 1, 2, 3, 4, and 5. Level 0 mean that the cutting edge was completely smooth and there was no separation. Level 1 meant that there was a little coating peeling off at the intersection of the incision but the cross-cut area significantly affected was not more than 5%. Level 2 meant that at the intersection of the incision and/or along the edge of the incision, the cross-cut area affected by coating shedding was significantly greater than 5% and not significantly greater than 15%. Level 3 meant that some or all of the coating was peeled off along the cutting edge with large fragments and/or some or all of the peeling off at different parts of the grid, the cross-cut area affected was significantly greater than 15% and not significantly greater than 35%. Level 4 meant that the coating was peeled off along the cutting edge and/or some or all of the squares appeared to peel off, the cross-cut area affected was significantly greater than 35% and not significantly greater than 65%. Level 5 meant that the degree of peeling off exceeded 4 levels.

Result of adhesion test was that the peeling grades of all the surface of sample 5, sample 6, and sample 7 were less than level 2.

(2) Bending Resistant Test

Test equipment was Cylindrical Bending Tester.

Sample preparation: the first radiative cooling functional coating material (including about 75% acrylic resin, about 25% aluminum silicate, wherein aluminum silicate was in the rod shape, had the approximate ratio 4:1 of the length to the diameter, and the particle diameter was 6 μm) was coated on a tinplate with an approximate size of 150 mm*70 mm*0.25 mm. After coating respectively by the wire rods with the size of about 120 μm and about 80 μm in one time and curing for about 168 hours, sample 8 was obtained. A second radiative cooling functional coating material (including a silicone resin containing alumina, wherein the shape of the alumina is a rod, the ratio of the length to the diameter was 6:1, and the particle diameter was 5 μm) was coated on a tinplate with an approximate size of 150 mm*70 mm*0.25 mm. After coating respectively by the wire rods with the size of about 120 μm and about 80 μm in one time and curing for 168 hours, sample 9 was obtained.

A weather resistant resin (fluorinated ethylene propylene copolymer (FEP) resin) was coated on a tinplate with an approximate size of 150 mm*70 mm*0.25 mm. After coating respectively by the wire rods with the size of about 120 μm and about 80 μm in one time and curing for about 168 hours, sample 10 was obtained.

Test procedure: the flexibility of the sample was tested using a cylindrical bending tester. If there was no visible ridge or crack on the surface of the sample or the size of the ridges and cracks was less than 2 mm, the sample was regarded to be acceptable.

The bending resistance property of sample 8, sample 9, and sample 10 was tested.

Result of bending resistance test was the surface of sample 8, sample 9, and sample 10 showed no visible ridge or crack.

(3) Scrub Resistance Test

Test equipment was Washing Tester.

Sample preparation: a first radiative cooling functional coating material (including about 90% acrylic resin and about 10% aluminum silicate, wherein aluminum silicate had a rod shape, the ratio of the length to the diameter was about 4:1, and the particle diameter was about 4 μm) was coated on PVC plastic sheet with an approximate size of 432 mm*165 mm*0.25 mm. After scraping by a gap wet film preparation machine with a size of about 200 μm one time and curing for about 7 days, sample 11 was obtained. A second radiative cooling functional coating material (including about 85% silicone resin and about 15% aluminum oxide, wherein aluminum oxide was in the rod shape, the ratio of the length to the diameter was about 6:1, and the particle diameter was about 3 μm) was coated on PVC plastic sheet with an approximate size of 432 mm*165 mm*0.25 mm. After scraping by a gap wet film preparation machine with a size of about 200 μm one time and curing for about 7 days, sample 12 was obtained.

A weather resistant resin (fluorinated ethylene propylene copolymer (FEP) resin) was coated on a plastic sheet with an approximate size of 432 mm*165 mm*0.25 mm. After scraping by a gap wet film preparation machine with a size of about 200 μm one time and curing for about 7 days, sample 13 was obtained.

Test procedure: the sample was scrubbed with an aqueous solution of about 2.5 g/L sodium dodecylbenzene-sulfonate, the brush moved in a frequency of reciprocating 37±2 cycles per minute, and the distance of one reciprocating stroke was about 300 mm*2. The brush moved in the middle area of about 100 mm at a constant speed. When the number of reciprocations of the brush was up to 10,000, the sample was taken out and the surface of the sample was observed if it was damaged.

The scrub resistant property of sample 11, sample 12, and sample 13 was tested.

Result of scrub resistant test was that the surfaces of sample 11, sample 12, and sample 13 were not damaged.

[Engineering Application]

The selective radiative cooling coating layers of the present disclosure can be applied in a variety of different fields and application on buildings, storage devices, textiles, helmets, and waterproof coiled material are as examples in the following description.

Case 1: Display House

In order to explain the cooling and cooling effect of the selective radiative cooling coating layer, the selective radiative cooling coating layer was applied on the building as an example in the following description.

A display house was made of stainless steel material and had a length, a width and a height of about 5 m, about 4 m, and about 3 m, respectively. A selective radiative cooling coating layer was formed on the outside of the roof and four walls. The selective radiative cooling coating layer included a primer resin layer (acrylic resin) with a thickness of about 20 μm, a first radiative cooling functional layer (formula X) with a thickness of about 100 μm, a second radiative cooling functional layer (formula Y) with a thickness of about 15 μm, and a weather resistant resin layer (polyvinylidene fluoride resin) with a thickness of about 20 μm from the bottom to the top. The selective radiative cooling coating layer had a reflectivity of 91% in a wave range of 0.3 μm to 2.5 μm and an emissivity of about 94% in a wave range of 7 μm to 14 μm. The outdoor display house with the selective radiative cooling coating layer was defined as display house A, which was measured on a lawn on No. 88, Dongfeng Road, Fenghua District, Ningbo City on Aug. 22, 2018 using a thermocouple with a data logger. Record the temperature changes within 24 hours of a total of 9 test points on the surface and inside of the display house A.

Another display house of the same size, material, structure and shape was placed in the same environment as the display house A, except that there was no selective radiative cooling coating layer on the outside of the roof and the four walls. The display house without selective radiative cooling coating layer was defined as display house B. The thermocouple with data logger was used to measure and record the temperature changes over the same time period as the showing room A for a total of nine test points on the surface and inside of the display house B. The distributions of test points of the display house A and the display house B were the same, as shown in FIG. 7a.

Figure 7A:
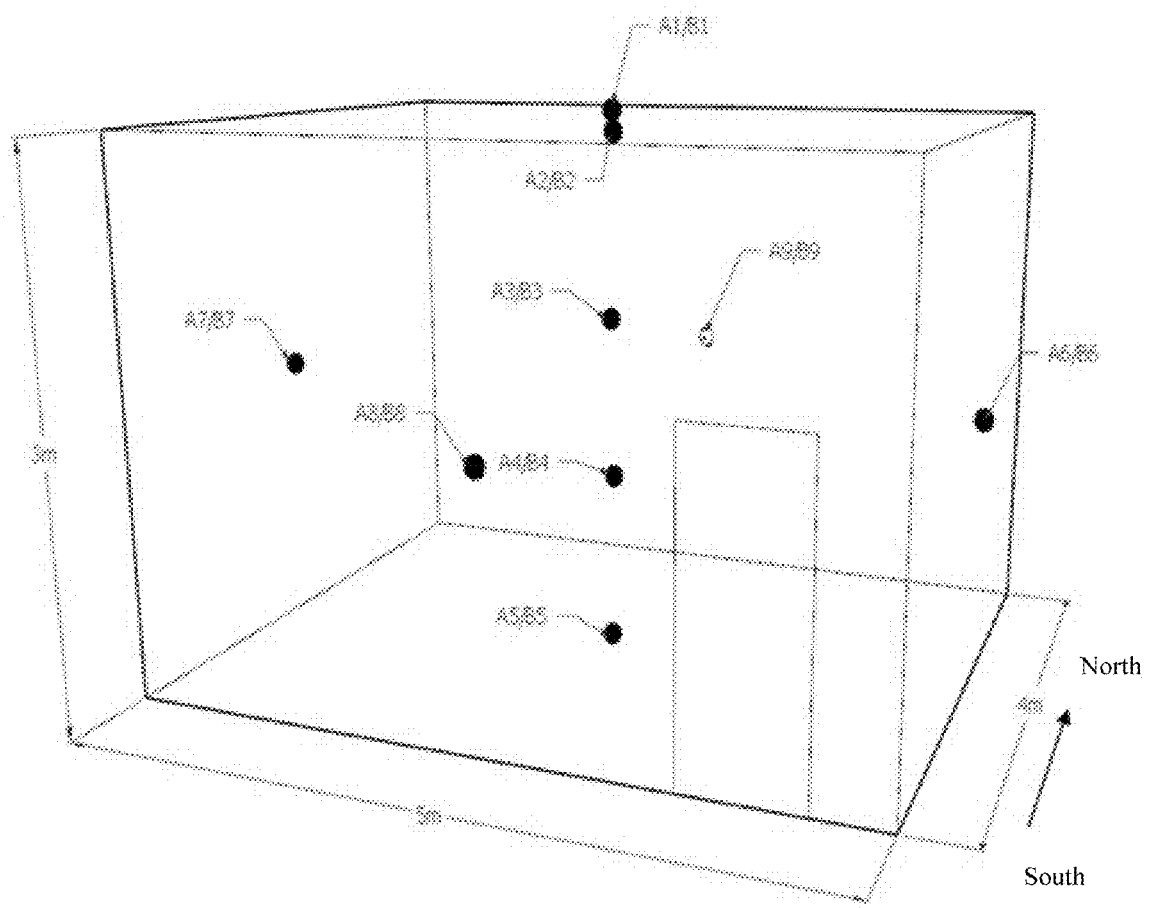
FIG. 7a is a distribution diagram of temperature test points of the display house A and the display house B, both with a length, a width and a height of 5 m, 4 m, 3 m, respectively.

In FIG. 7a, A1, A6, A7, A8, and A9 were respectively at the middle position of the outer surface of the roof of the display house A, at the middle position of the outer surface of the east side wall, at the middle position of the outer surface of the west side wall, at the middle position of the outer surface of the south side wall, and at the middle position of the outer surface of the north side wall. A2, A3, A4, and A5 were test points for air temperature on the same vertical line perpendicular to the ground in the display house A, had different heights from the ground. The outdoor ambient temperature was also tested.

In FIG. 7a, B1, B6, B7, B8, and B9 were respectively at the middle position of the outer surface of the roof of the display house B, at the middle position of the outer surface of the east side wall, at the middle position of the outer surface of the west side wall, at the middle position of the outer surface of the south side wall, and at the middle position of the outer surface of the north side wall. B2, B3, B4, and B5 were test points for air temperature on the same vertical line perpendicular to the ground in the display house B, had different heights from the ground. The outdoor ambient temperature was also tested.

Figure 7B:
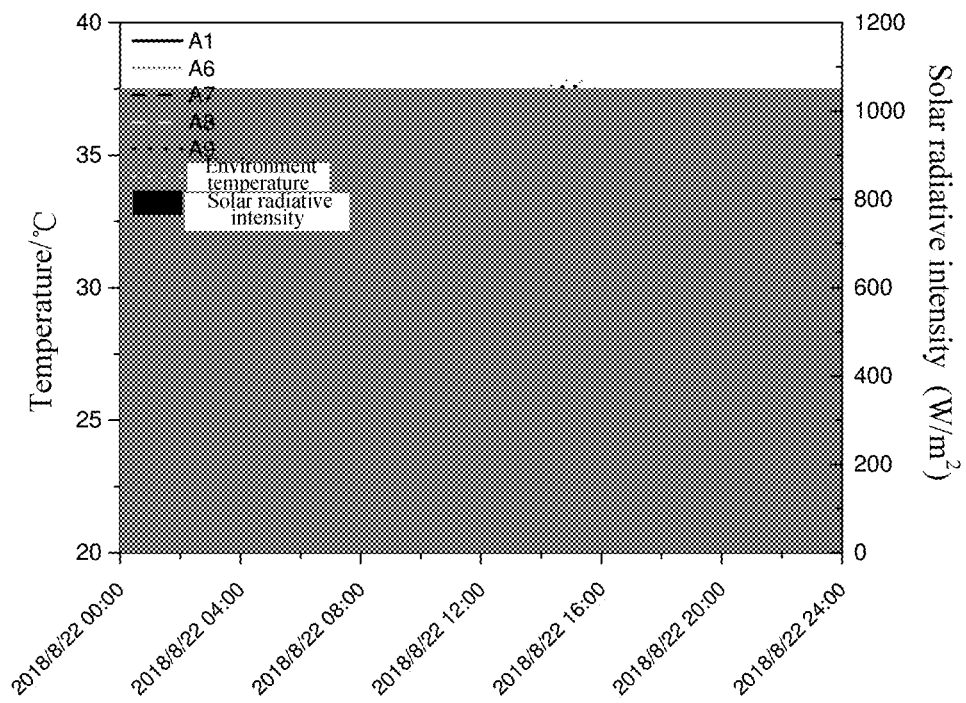
FIG. 7b is temperature graph of different test points on the surface of the display house A and the outdoor environment.

Referring to FIG. 7b, temperature graph of different test points on the surface of the display house A and the outdoor environment was showed. It can be seen from FIG. 7b that the temperature of the outer surface of the display house A with the selective radiative cooling coating layer (including the roof and the northeast and southwest directions) was lower than that of the outdoor environment by about 6.1 degrees centigrade.

Figure 7C:
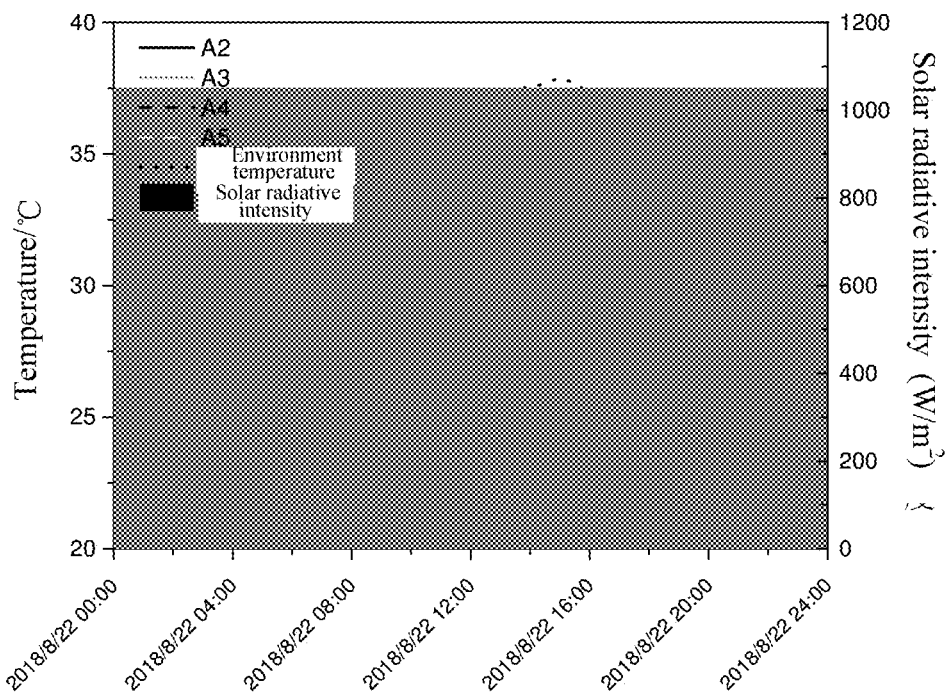
FIG. 7c is temperature graph at different points in the longitudinal direction of the display house A.

Referring to FIG. 7c, temperature at different points in the longitudinal direction of the display house A with the selective radiative cooling coating layer was lower than that of the outdoor environment in 24 hours. Compared with the outdoor, the temperature dropped by about 5.5 degrees centigrade. As the sunshine time increased, the more the position near the roof was, the lower the temperature was. It indicated that the selective radiative cooling coating layer had obvious passive radiative cooling effect.

Figure 7D:
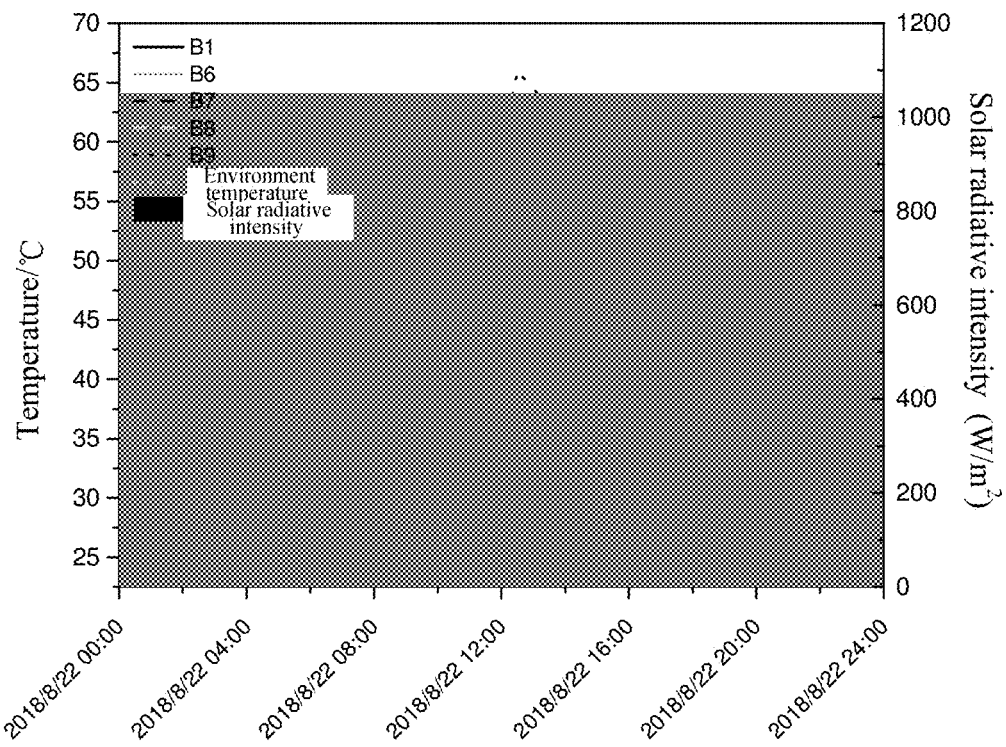
FIG. 7d is temperature graph of different test points on the surface of the display house B and the outdoor environment.

Referring to FIG. 7d, temperature at the outer surface of the display house B (including the roof and directions of the south, the east, the north and the west) without the selective radiative cooling coating layer is higher than that of the outdoor environment by about 21 degrees centigrade. As can be seen from FIGS. 7b and 7d, the temperature of the display house A with the selective radiative cooling coating layer was lower than that of the display house B without the selective radiative cooling coating layer by about 24 degrees centigrade.

Figure 7E:
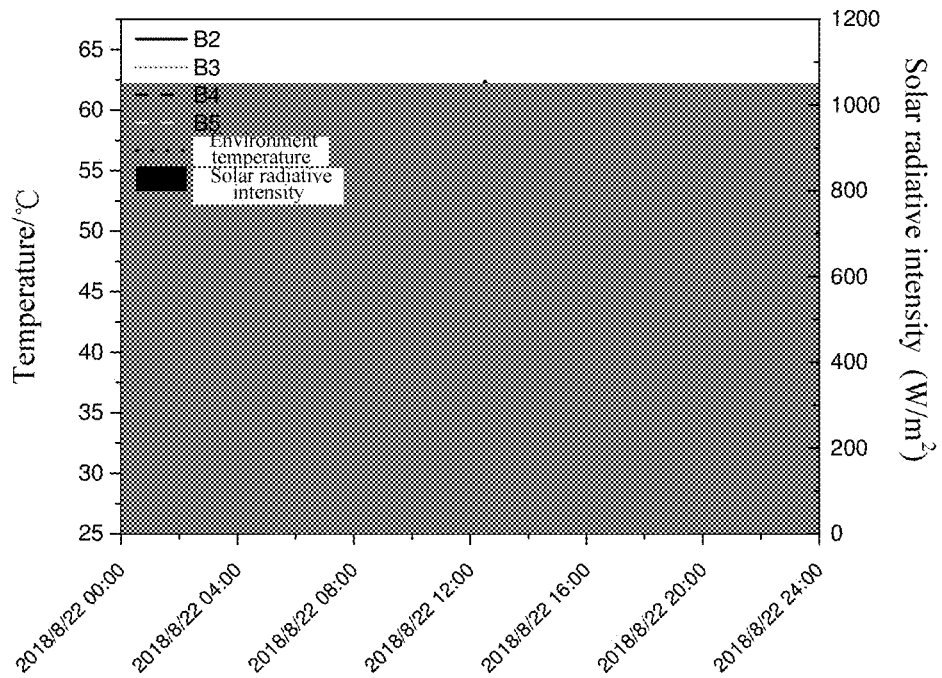
FIG. 7e is temperature graph at different points in the longitudinal direction of the display house B.

As can be seen from FIG. 7e, the display room B without the selective radiative cooling coating had a large temperature difference at different points in the longitudinal direction. As the sunshine time increased, the more the position near the roof was, the higher the temperature was. The temperature stratification was more obvious.

Case 2: Water Tank

In order to illustrate the cooling and cooling effect of the selective radiative cooling coating layer, the selective radiative cooling coating layer was applied on the storage device as an example in the following description.

Example 1

A water tank was made of plastic material and had a length, a width and a height of about 800 mm, about 800 mm, and about 80 mm, respectively. The water tank was provided with the selective radiative cooling coating layer on the upper surface of the water tank. The selective radiative cooling coating layer included a primer with a thickness of about 30 μm, a resin layer (epoxy resin), a first radiative cooling functional layer (formula X) with a thickness of about 120 μm, a second radiative cooling functional layer (formula Y) with a thickness of about 20 μm, and a weather resistant resin layer (fluorine carbon resin) with a thickness of about 30 μm from bottom to top. The reflectivity of the selective radiative cooling coating layer was about 91% in a wave range of 0.3 μm to 2.5 μm, and the emissivity was about 96% in a wave range of 7 μm to 14 μm. The water tank with the selective radiative cooling coating layer was defined as the water tank C. One temperature test point C1 was set at the center of the water tank C.

Comparative Example 1

Figure 8A:
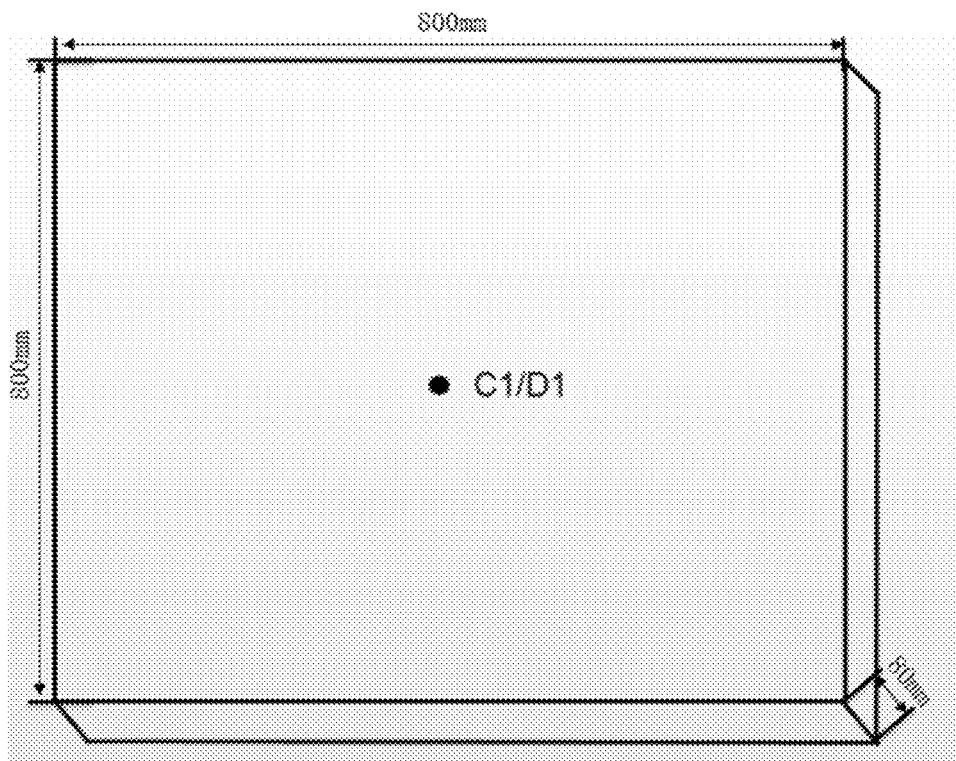
FIG. 8a is a schematic diagram of positions of temperature test points at the centers of the water tanks C and D, each with a length, a width and a height of 800 mm, 800 mm, 80 mm, respectively.

The water tank of the same material and size as the water tank C and not treated at all on the upper surface was defined as the water tank D. One temperature test point D1 was set at the center of the water tank D in the same position of the temperature test point C1. The positions of the temperature test points C1 and D1 were respectively at the centers of the water in the water tanks C and D as shown in FIG. 8a. From Aug. 20 to Aug. 21, 2018, the temperature changes of the temperature test points C1 and D1 in the water tank were tested on the lawn of No. 88 Dongfeng Road, Fenghua District, Ningbo City. The test results were shown in FIG. 8b.

Figure 8B:
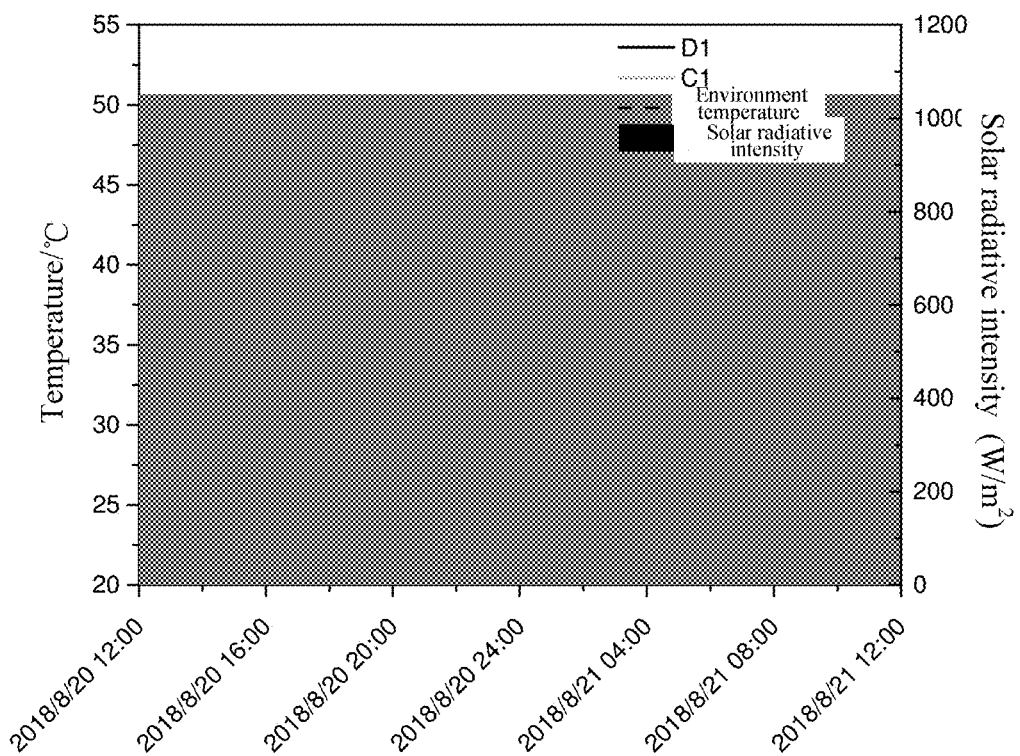
FIG. 8b is a temperature plot of the temperature test points of the water tanks C and D.

Referring to FIG. 8b, firstly, the temperature of the water temperature test point C1 in the water tank C of the selective radiative cooling coating layer was lower than that of the outdoor environment in 24 hours. Compared with the outdoor environment, the temperature was dropped by about 5.3 degrees centigrade to an extreme. It indicated that the selective radiative cooling coating layer had obvious passive radiative cooling effect. Secondly, the temperature of the temperature test point C1 of the water tank C with the selective radiative cooling coating layer was lower than that of the temperature measuring point D1 of the water tank D without the selective radiative cooling coating layer in 24 h, by about 14.4 degrees centigrade to an extreme. It indicated that the selective radiative cooling coating layer had an obvious passive radiative cooling effect.

Case 3: Tent

In order to illustrate the cooling and cooling effect of the selective radiative cooling coating layer, the selective radiative cooling coating layer was applied on the textile as an example in the following description.

A selective radiative cooling coating layer was formed on the surface of the tent E, and the selective radiative cooling coating layer included a primer resin layer with a thickness of about 40 μm (including acrylic resin and epoxy resin with a mass ratio of 1:1), a first radiative cooling functional layer (formula X) with a thickness of about 130 μm, a second radiative cooling functional layer (formula Y) with a thickness of about 30 μm, a weather resistant resin layer (ethylene-tetrafluoroethylene copolymer resin) with a thickness of about 40 μm from bottom to top. The reflectivity of the selective radiative cooling coating layer was about 92% in a wave range of 0.3 μm to 2.5 μm, and the emissivity was about 97% in a wave range of 7 μm to 14 μm.

Comparative Example 1

Figure 9A:
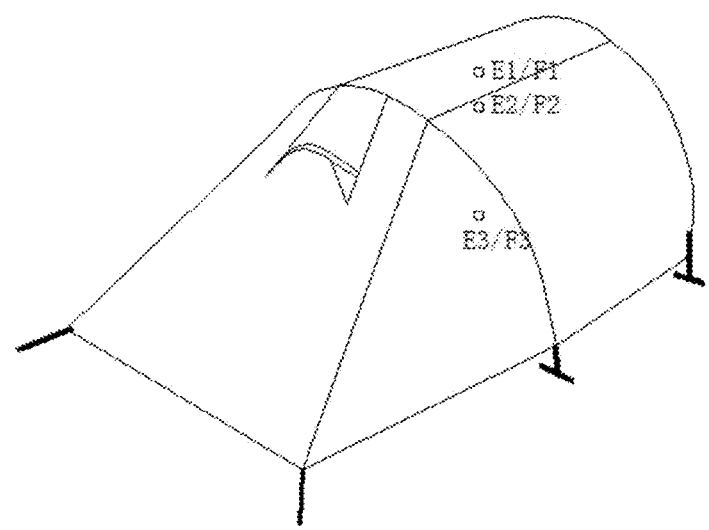
FIG. 9a is a schematic diagram of the temperature test points in the tent E and the tent F.

Another tent F of the same size, material and style as the tent E was not treated on the surface. On Apr. 26, 2019, temperature changes at different locations inside the tent E and the tent F were tested on the lawn of No. 88 Dongfeng Road, Fenghua District, Ningbo City. Temperature change in the outdoor was measured. As shown in FIG. 9a, it is a schematic diagram of the temperature test points in the tent E and the tent F.

Among them, E1/F1, E2/F2, E3/F3 were the three temperature test points on the vertical line of the tents E and F and the ground, and E1/F1 is the temperature test points on the surface of the tent E/F. E2/F2 is the temperature test point having distances of about 2 cm from the top of the tent E/F, and E3/F3 is the temperature test points of the inner center of the tents E/F.

Figure 9B:
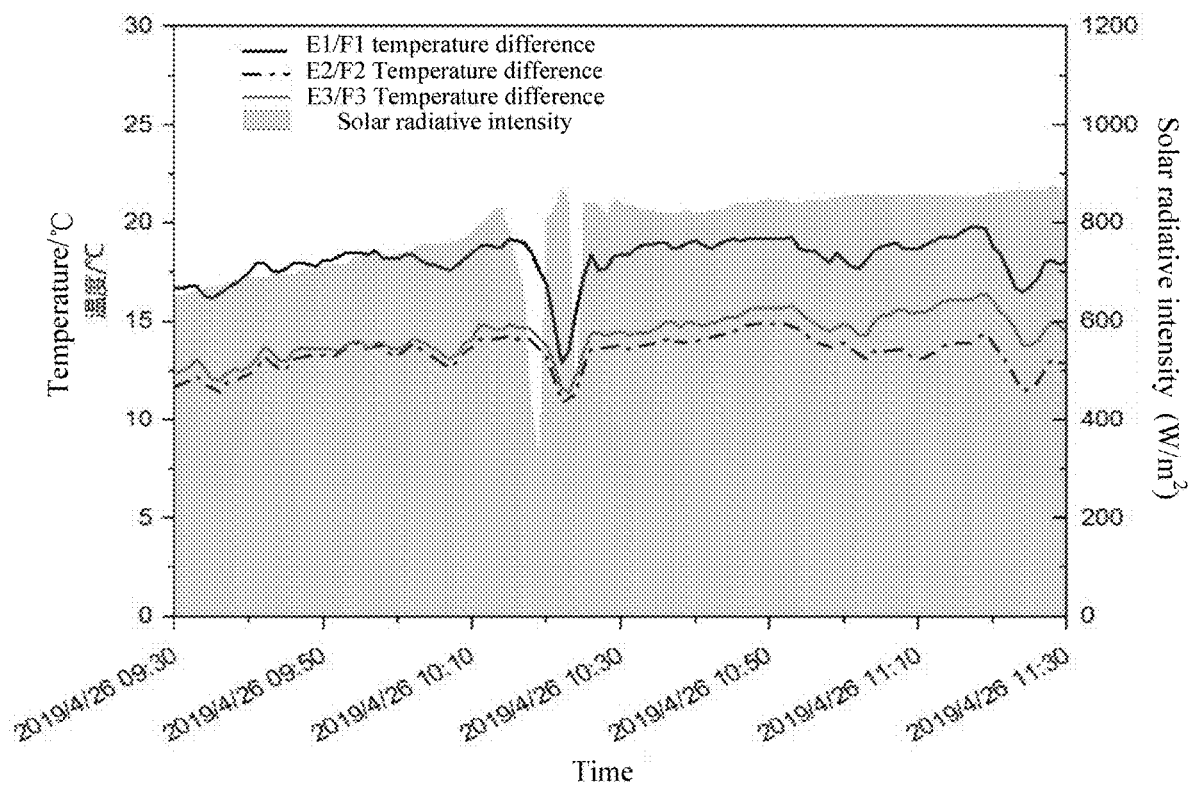
FIG. 9b is a graph showing the temperature difference of the temperature test points in the tents E and F.

FIG. 9b is a graph showing the temperature difference of the temperature test points in the tents E and F.

Referring to FIG. 9b, firstly, the temperature in the tent E with the selective radiative cooling coating layer is lower than that in the tent F without the selective radiative cooling coating layer by about 10 degrees centigrade to 17 degrees centigrade. Secondly, the selective radiative cooling coating lay on the tent had an obvious passive cooling effect, which can reduce the internal temperature of the tent and improve the comfort of the tent.

Case 4: Helmet

When a selective radiative cooling coating layer is applied to the hat/helmet field, the temperature inside the cap/helmet can be greatly reduced, and the comfort of the cap/helmet can be increased under the sun.

To illustrate the effect of the selective radiative cooling coating, the following is exemplified.

Example 1

A selective radiative cooling coating layer was disposed on the outer surface of the helmet. The selective radiative cooling coating layer included a primer resin layer with a thickness of about 50 μm (including an acrylic resin and an epoxy resin with a mass ratio of 2:1), a first radiative cooling functional layer (formula X) with a thickness of about 150 μm, a second radiative cooling functional layer (formula Y) with a thickness of about 50 μm, and a weather resistant resin layer (fluorinated ethylene propylene copolymer resin) with a thickness of about 50 μm from bottom to top. The selectivity of the selective radiative cooling coating layer was about 92% at a wave range of 0.3 μm to 2.5 μm, and the emissivity was about 97% in a wave range of 7 μm to 14 μm. The helmet with selective radiative cooling coating layer was defined as G, one temperature test point at the top position inside the helmet was defined as G1.

Comparative Example 1

Figure 10A:
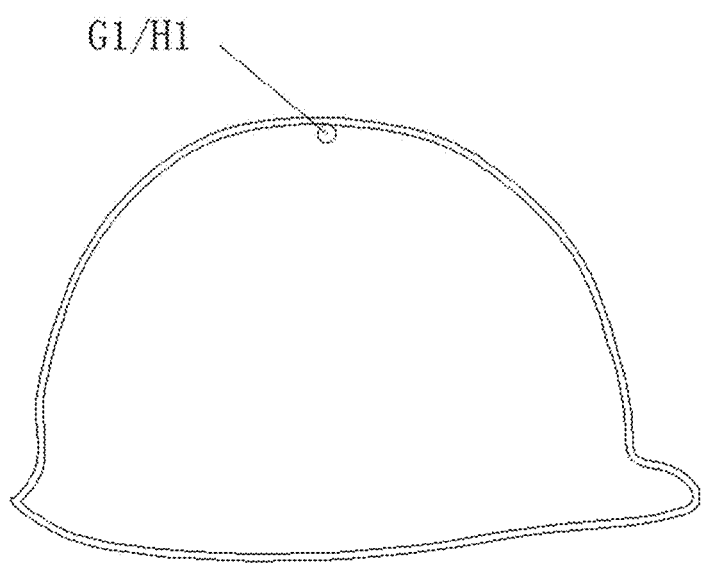
FIG. 10a is a schematic diagram of the temperature test points in helmets G and H.

Another helmet of the same type as helmet G had no treatment on the outer surface and defined as H. One temperature test point at the same top position inside the helmet H as helmet G was defined as H1. A schematic diagram of the temperature test points in helmets G and H, as shown in FIG. 10a. From Apr. 16, 2019 to Apr. 18, 2019, the temperature changes of the top temperature test points H1 and G1 in the helmet were tested on a top of a building on No. 88, Dongfeng Road, Fenghua District, Ningbo City. The test results were shown in FIG. 10b.

Figure 10B:
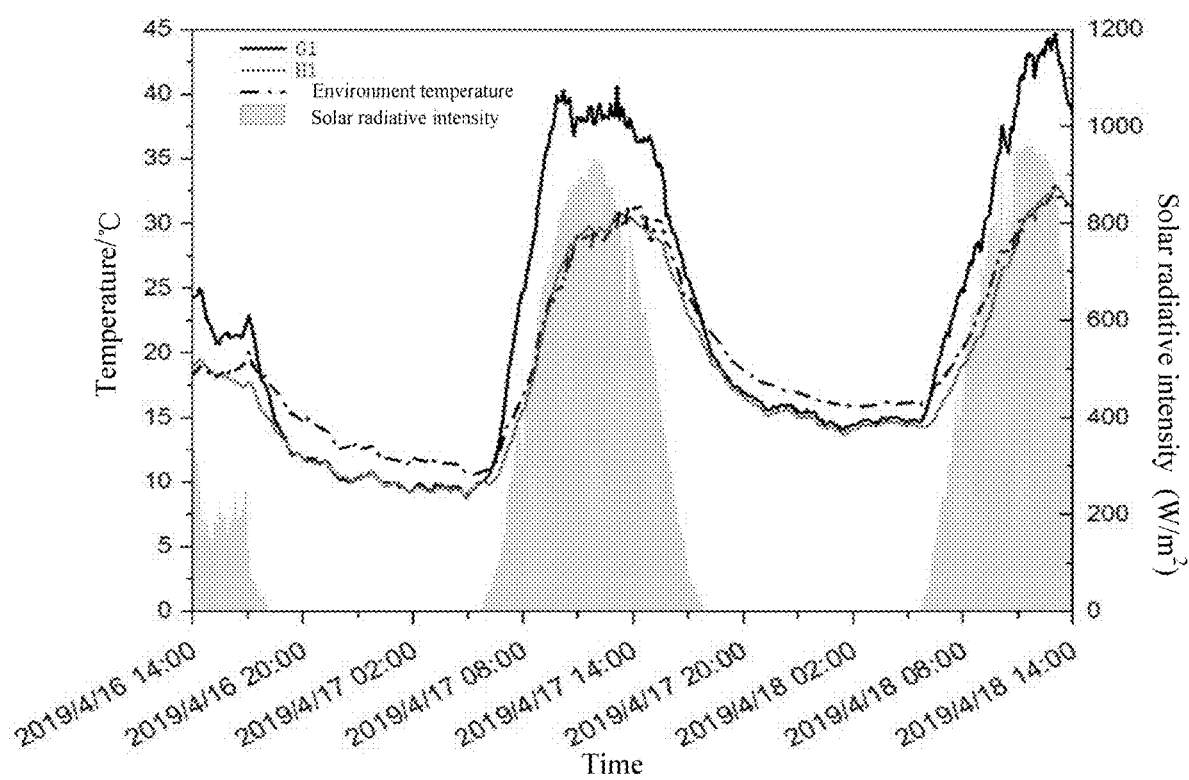
FIG. 10b is a graph showing the temperature of the temperature test points in helmets G and H.

It can be seen from FIG. 10b that the temperature difference between the normal helmet (helmet H) and the cooling helmet (helmet G) was tested, and the test point was the top position in the helmet. The maximum temperature difference at about 11 am could reach to about 13.5 degrees centigrade. Secondly, the cooling effect was proportional to the solar radiation intensity. The higher the irradiation intensity was, the better the cooling effect was. Thirdly, the selective radiative cooling coating layer had an obvious passive cooling effect on the surface of the helmet, which can reduce the internal temperature of the helmet and improve the comfort of the helmet.

Case 5: Waterproof Coiled Material

Applying the selective radiative cooling coating layer to the field of waterproof coiled material can solve the problem of excessive temperature of the flat roof or the inclined roof, reduce the temperature of the roof floor, reduce the cooling energy consumption, and save energy and environmental protection while ensuring waterproofing.

To illustrate the cooling effect of the selective radiative cooling coating layer, the following is exemplified.

Example 1

The selective radiative cooling coating layer was disposed on the outer surface of the waterproof coiled material directly facing the air. The selective radiative cooling coating layer includes a primer resin layer (including acrylic resin) with a thickness of about 50 μm, a first radiative cooling functional layer (formula X) with a thickness of about 200 μm, a second radiative cooling functional layer (formulation Y) with a thickness of about 60 μm, a weather resistant resin layer (ethylene-tetrafluoroethylene copolymer resin) with a thickness of 10 μm from bottom to top. The reflectivity of the selective radiative cooling coating layer was about 92% in a wave range of 0.3 μm to 2.5 μm, and the emissivity was about 97% in a wave range of 7 μm~14 μm. The waterproof coiled material with the selective radiative cooling coating layer was defined as I, in which a temperature test point I1 was set on the front side, and a temperature test point I2 was set on the back side.

Comparative Example 1

Another waterproof coiled material (the same batch of products) had no treatment on the outer surface and defined as J, in which a temperature test point J1 was set on the front side, and a temperature test point J2 was set on the back side.

On May 23, 2019, the temperature of the front and back temperature test points of the waterproof coiled materials I and J within 24 hours was tested on a top of a building at No. 88, Dongfeng Road, Fenghua District, Ningbo City. Graph showing the temperature of the front and back temperature test points of waterproof coiled material I and J was shown in FIG. 11.

Figure 11:
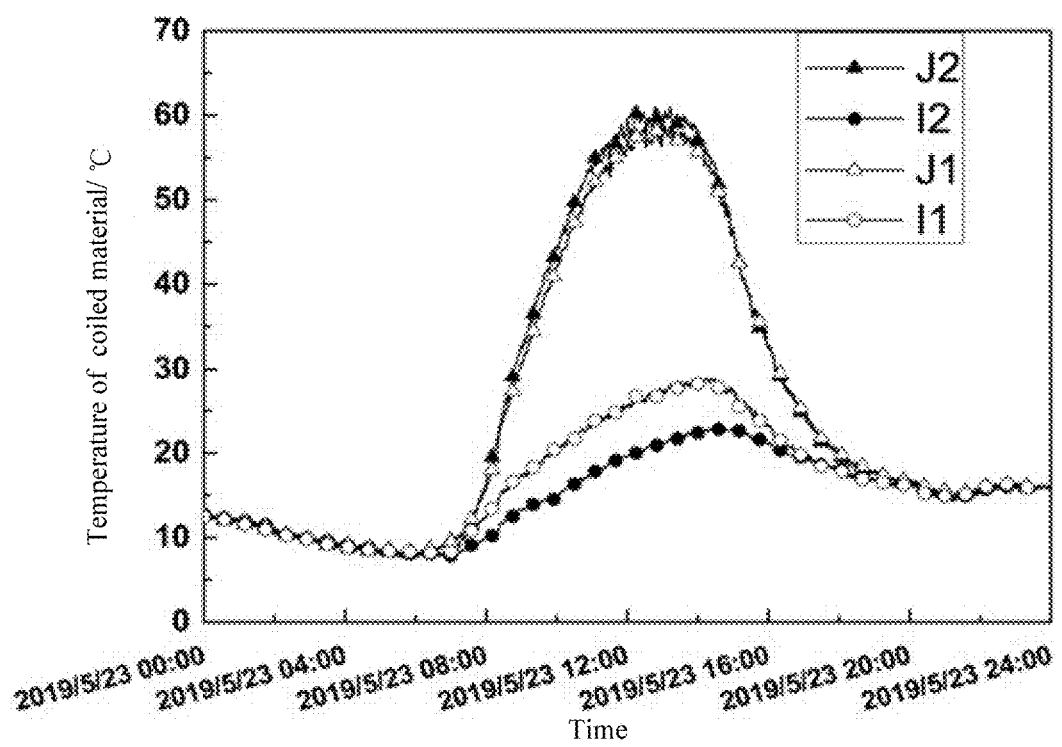
FIG. 11 is a graph showing the temperature of the front and back temperature test points of waterproof coiled material I and J.

Referring to FIG. 11, firstly, the temperature of the front and back surfaces of the waterproof coiled material I with the selective radiative cooling coating layer on the front side was significantly lower than that of the front and back surfaces of the waterproof coiled material J without the selective radiative cooling coating layer, and the maximum temperature difference could reach 40 degrees centigrade. Secondly, the temperature difference between the waterproof coiled material I and J could reach the maximum at noon, indicating that the selective radiative cooling coating layer had the best radiative cooling effect at noon. Thirdly, the temperature difference between the lower surface of waterproof coiled material I and J was larger than that of the upper surface, because the upper surface test point was affected by atmospheric convection heat transfer. Fourthly, the selective radiative cooling coating layer could effectively reduce the surface temperature of the waterproof coiled material for a long time, thereby reducing the overall temperature of the roof.

In the foregoing embodiments, the descriptions of the various embodiments are different, and the parts that are not described in detail in a certain embodiment may be referred to the related descriptions of other embodiments.

The above embodiments are only used to explain the technical solutions of the present disclosure and are not limited thereto. Those skilled in the art should understand that they can still modify the technical solutions described in the above embodiments, or some technical features are equivalently substituted; and these modifications or substitutions do not detract from the essence of the corresponding technical solutions from the spirit and scope of the technical solutions of the embodiments of the present disclosure.

We claim:

1. A selective radiative cooling coating layer comprising a radiative cooling functional layer manufactured by a radiative cooling functional coating material,
    the radiative cooling functional layer comprises a first radiative cooling functional layer and a second radiative cooling functional layer stacked in order,
    the first radiative cooling functional layer comprises the radiative cooling functional resin and a first granular filler distributed in the radiative cooling functional resin, and is configured for reflecting the visible light and the near-infrared light and emitting heat through the atmospheric window in the form of infrared radiation;
    the second radiative cooling functional layer comprises the radiative cooling functional resin and a second granular filler distributed in the radiative cooling functional resin, and is configured for reflecting the ultraviolet light and the visible light and emitting heat through the atmospheric window in the form of infrared radiation;
    the first granular filler is aluminum silicate, pearl powder, silicon dioxide, calcium carbonate, barium sulfate, talcum powder, titanium dioxide, zinc sulfide, ceramic powder, ceramic bead, glass bead, or a combination thereof,
    the second granular filler is aluminum oxide, zinc oxide, zirconium oxide, cerium oxide, lanthanum oxide, rhodium dioxide, magnesium oxide, or a combination thereof.

2. The selective radiative cooling coating layer of claim 1, wherein
    the first radiative cooling functional layer has a thickness of 30 μm to 300 μm, and the second radiative cooling functional layer has a thickness of 10 μm to 60 μm.

3. The selective radiative cooling coating layer of claim 1, wherein the first radiative cooling functional layer comprises a first surface, and the second radiative cooling functional layer comprises a second surface away from the first surface,
    wherein the selective radiative cooling coating layer further comprises a weather resistant resin layer located on the first surface of the first radiative cooling functional layer, and/or a primer resin layer located on the second surface of the second radiative cooling functional layer; or
    the selective radiative cooling coating layer further comprises a primer resin layer located on the first surface of the first radiative cooling functional layer, and/or a weather resistant resin layer located on the second surface of the second radiative cooling functional layer,
    the weather resistant resin layer has a transmittance that is larger than or equal to 80%, and a material of the weather resistant resin layer comprises fluorine-containing resin, epoxy resin, polyester, polyurethane, acrylic resin, silicon resin, or a combination thereof,
    a material of the primer resin layer comprises an epoxy resin and/or an acrylic resin,
    the weather resistant resin layer has a thickness of 10 μm to 50 μm, and the primer resin layer has a thickness of 10 μm to 50 μm.

4. The selective radiative cooling coating layer of claim 1, wherein the radiative cooling functional layer has a reflectivity of solar energy that is greater than or equal to 80% and an atmospheric window emissivity that is larger than or equal to 80%, and is able to provide a radiative cooling power of larger than or equal to 100 W/m$^2$ at room temperature.

5. A composite material comprising a substrate and the selective radiative cooling coating layer of claim 1, wherein the selective radiative cooling coating layer is disposed on the substrate.

6. The composite material of claim 5, wherein the substrate is metal, plastic, rubber, concrete, cement, asphalt, paper, textile, wood, ceramic tile, glass, or organic synthetic material.

7. The selective radiative cooling coating layer of claim 1, wherein a weight ratio of the first granular filler to the first radiative cooling functional resin is in a range of 1:10 to 6:1;
    a weight ratio of the second granular filler to the second radiative cooling functional resin is in a range of 1:10 to 6:1.

8. The selective radiative cooling coating layer of claim 1, wherein the first granular filler and the second granular filler has a shape of a rod, a sphere or an ellipsoid,
    when the first granular filler is rod shaped or ellipsoid shaped, a ratio of a length of the first granular filler to a diameter of the first granular filler is in a range of 1:1 to 10:1; and
    when the second granular filler is rod shaped or ellipsoid shaped, a ratio of a length of the second granular filler to a diameter of the second granular filler is in a range of 1:1 to 10:1.

9. The selective radiative cooling coating layer of claim 1, wherein the first granular filler is orderly arranged in the first radiative cooling functional layer, the first granular filler being uniformly and directionally distributed in the first radiative cooling functional layer; and/or
    the second granular filler is orderly arranged in the second radiative cooling functional layer, the second granular filler being uniformly and directionally distributed in the second radiative cooling functional layer.

10. The selective radiative cooling coating layer of claim 1, wherein the first granular filler has a diameter in a range of 0.5 μm to 40 μm, and the second granular filler has a diameter in a range of 0.01 μm to 40 μm.

11. The selective radiative cooling coating layer of claim 1, wherein both the radiative cooling functional resin in the first radiative cooling functional layer and the radiative cooling functional resin in the second radiative cooling functional layer are epoxy resin, polyester, polyurethane, acrylic resin, silicone resin, or a combination thereof.

12. The selective radiative cooling coating layer of claim 1, wherein the first radiative cooling functional layer further comprises a directional agent configured for controlling an orientation of the first granular filler; and/or
    the second radiative cooling functional layer further comprises a directional agent configured for controlling an orientation of the second granular filler.

13. The selective radiative cooling coating layer of claim 12, wherein the directional agent is aqueous acetic acid-butyl cellulose, ethylene-vinyl acetate copolymer wax emulsion, polyethylene wax, polyamide wax, or a combination thereof.

14. The selective radiative cooling coating layer of claim 1, wherein the first radiative cooling functional layer further comprises a pigment; and/or
    the second radiative cooling functional layer further comprises a pigment.

15. The selective radiative cooling coating layer of claim 14, wherein the pigment is a fluorescent dye.

16. An application method of the selective radiative cooling coating layer of claim 1, the application method comprising forming the selective radiative cooling coating layer on a surface of a main body, wherein the selective radiative cooling coating layer is configured for reflecting and/or emitting heat outwardly.

17. The application method of the selective radiative cooling coating layer of claim 16, the main body is one of a building, a photovoltaic module, a system comprising the photovoltaic module, an automobile, an outdoor product, greenhouses of agriculture, husbandry, and aquaculture, aerospace equipment, a cold chain transportation device, an outdoor cabinet, textile industry, outdoor communication equipment, industrial equipment, a public service, a cooling water system, an energy system and energy-saving equipment.

* * * * *